(12) United States Patent  
Imanishi et al.

(10) Patent No.: US 8,610,855 B2
(45) Date of Patent: Dec. 17, 2013

(54) LIQUID CRYSTAL DISPLAY DEVICE

(75) Inventors: Yasuo Imanishi, Katano (JP); Masaki Matsumori, Naka-gun (JP); Yasushi Tomioka, Hitachinaka (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 262 days.

(21) Appl. No.: 13/029,323

(22) Filed: Feb. 17, 2011

(65) Prior Publication Data

US 2011/0222006 A1 Sep. 15, 2011

(30) Foreign Application Priority Data

Mar. 15, 2010 (JP) .................................. 2010-058509

(51) Int. Cl.
*G02F 1/141* (2006.01)
(52) U.S. Cl.
USPC ......................................................... 349/135
(58) Field of Classification Search
USPC .......................................................... 349/135
See application file for complete search history.

(56) References Cited

U.S. PATENT DOCUMENTS

| | | | |
|---|---|---|---|
| 4,556,288 A | 12/1985 | Sekimura | |
| 4,925,912 A * | 5/1990 | Rohde et al. | 528/226 |
| 2001/0005607 A1 * | 6/2001 | Hasegawa et al. | 438/162 |
| 2005/0105027 A1 | 5/2005 | Wada et al. | |
| 2006/0146257 A1 | 7/2006 | Park | |
| 2007/0109400 A1 * | 5/2007 | Woodgate et al. | 348/47 |

FOREIGN PATENT DOCUMENTS

| | | |
|---|---|---|
| JP | 58-75118 | 5/1983 |
| JP | 2000-310786 | 11/2000 |
| JP | 2001-42317 | 2/2001 |
| JP | 2005-165308 | 6/2005 |
| JP | 2006-189860 | 7/2006 |
| JP | 2006-234922 | 9/2006 |
| JP | 2007-248607 | 9/2007 |

OTHER PUBLICATIONS

Toshiaki Anzaki et al., The New Optical Coupling With the Super Wide Range AR by the Grin-Coat, Fibers and waveguide components P1.12.
Scott R. Kennedy et al., Porous Broadband Antireflection Coating by Glancing Angle Deposition, Applied Optic, Aug. 1, 2003, vol. 42, No. 22.

* cited by examiner

*Primary Examiner* — Timothy L Rude
(74) *Attorney, Agent, or Firm* — Antonelli, Terry, Stout & Kraus, LLP.

(57) ABSTRACT

Provided is a liquid crystal display device having a structure in which one surface of the alignment film contacts a liquid crystal layer, the other surface of the alignment film contacts an underlying layer, the refractive index of the alignment film monotonically increases in a film thickness direction of the alignment film from a boundary surface between the liquid crystal layer and the alignment film to a boundary surface between the underlying layer and the alignment film, and the minimum refractive index $n_{LC}$ of the liquid crystal layer, the refractive index $n_{F2}$ of the alignment film at the boundary surface between the liquid crystal layer and the alignment film, the refractive index $n_{F1}$ of the alignment film at the boundary surface between the alignment film and the underlying layer, and the refractive index $n_{S2}$ of the underlying layer have a relationship of an equation (I) in which $n_{LC} \leq n_{F2} < n_{F1} \leq n_{S2}$.

15 Claims, 7 Drawing Sheets

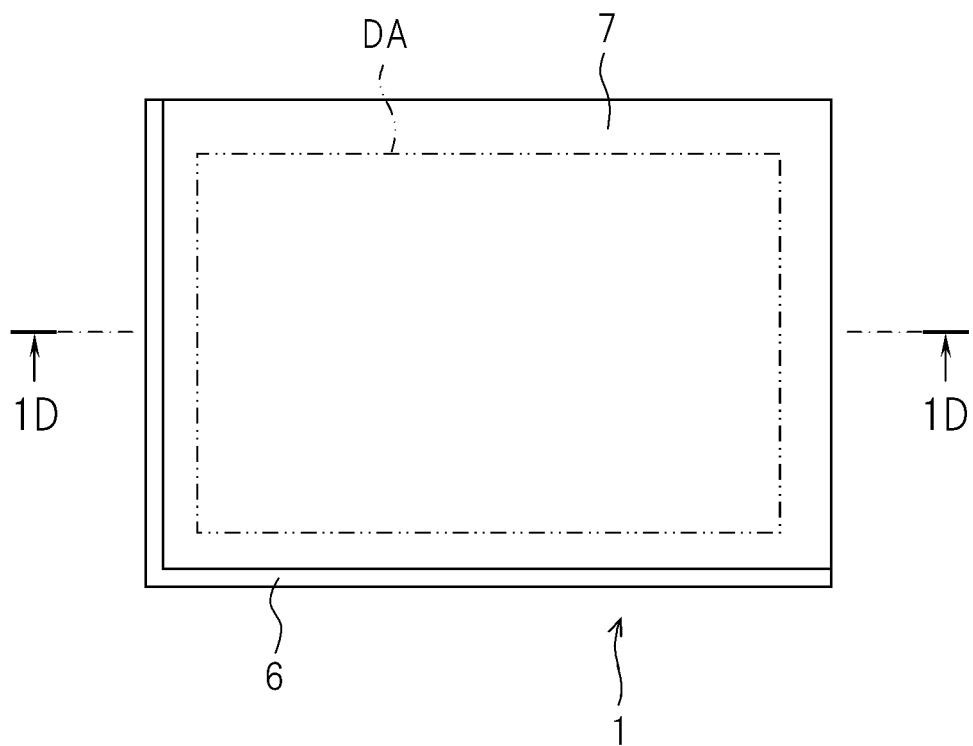
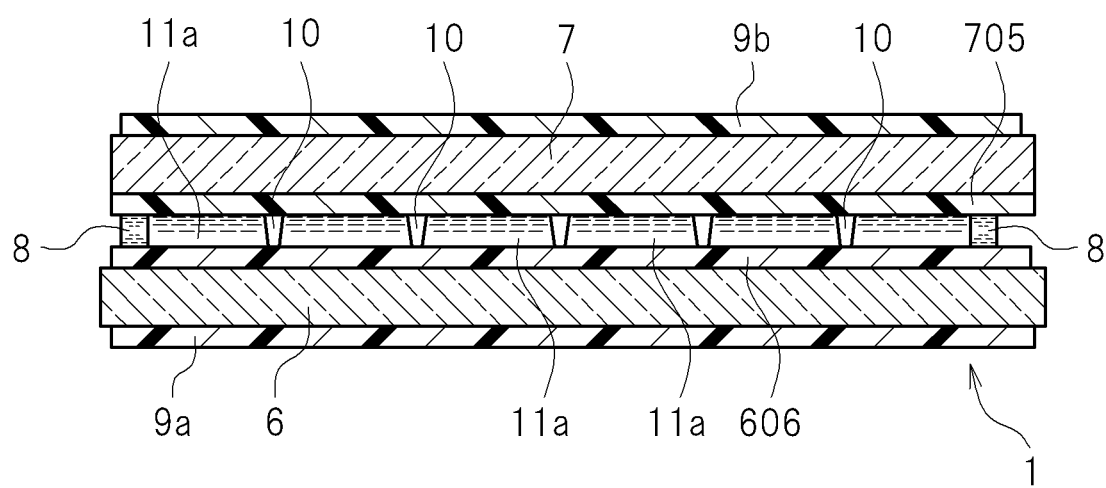

LIQUID CRYSTAL DISPLAY DEVICE

CROSS-REFERENCE TO RELATED APPLICATION

The present application claims priority from Japanese patent application JP2010-058509 filed on Mar. 15, 2010, the content of which is hereby incorporated by reference into this application.

BACKGROUND OF THE INVENTION

1. Field of the Invention

The present invention relates to a liquid crystal display device that has an alignment film with improved transparency and improved high contrast performance.

2. Description of the Related Art

A liquid crystal display device has been used in various fields due to its features such as high display quality, a thin thickness, a light weight, and low power consumption. For example, the liquid crystal display device has been used as a monitor for a portable device such as a cellular phone and a digital still camera, a monitor for a desktop PC, a monitor for printing or designing, a monitor for a medical device, an LCD television, and the like.

As the liquid crystal display device has been used in various fields, high image quality and high quality thereof have been demanded. Particularly, high luminance and low power consumption thereof with high transmissivity have been strongly demanded. Further, there is a strong demand in which the liquid crystal display device needs to be supplied to the market at a low price.

Generally, in the liquid crystal display device, an alignment direction of a liquid crystal molecule changes when applying an electric field to the liquid crystal molecule of a liquid crystal layer interposed between a pair of substrates, whereby optical characteristics of the liquid crystal layer change, so that an image is displayed on the liquid crystal display device. When there is no application of an electric field, the alignment direction of the liquid crystal molecule is determined by an alignment film obtained by performing a rubbing treatment on a surface of a polyimide thin film.

In the active driving type liquid crystal display device having a switching element such as a thin film transistor (TFT) for each pixel, an electrode is provided in each of a pair of substrates sandwiching a liquid crystal layer, a so-called vertical electric field is set so that the direction of the electric field applied to the liquid crystal layer is substantially perpendicular to a surface of the substrate, and an image is displayed on the liquid crystal display device by using an optical rotary power of a liquid crystal molecule forming the liquid crystal layer.

As the representative the vertical electric field system type liquid crystal display device, a twisted nematic (TN) type is known. In the TN type liquid crystal display device, a narrow viewing angle is one of a number of problems. Therefore, an IPS (In-Plane Switching) type or an FFS (Fringe-Field Switching) type has been introduced into the market as a display type of realizing a wide viewing angle.

Each of the IPS type and the FFS type is a so-called horizontal electric field type in which a pectinate electrode is formed at one of a pair of substrates, and a generated electric field is substantially parallel to the surface of the substrate. Here, a liquid crystal molecule forming the liquid crystal layer is rotated within a plane substantially parallel to the substrate, and an image is displayed by using birefringence of the liquid crystal layer. This type has benefits that a viewing angle is wider than that of the TN type due to the in-plane switching of the liquid crystal molecule and load capacity is lower than that of the TN type. Due to such benefits, the horizontal electric field type has been expected to be a new liquid crystal display device which may be used instead of the TN type, and has been rapidly developed in recent years.

The liquid crystal display element controls the alignment state of the liquid crystal molecule inside the liquid crystal layer by the presence of the electric field. That is, upper and lower polarizers provided outside the liquid crystal layer are disposed to be completely perpendicular to each other, and a phase difference is generated by the alignment state of the liquid crystal molecule therebetween, thereby forming light and dark state.

The transmissivity of the liquid crystal display element is largely dependent on not only light absorbing or scattering of various optical thin films such as a substrate, a transparent electrode, a liquid crystal layer, and a polarizer, but also light reflecting at a boundary surface originating from a difference in refractive index between optical thin films. The maximum refractive index may be obtained inside the optical thin film of the liquid crystal display element by indium tin oxide (ITO) having a refractive index set to 2.1 and used in a transparent electrode or silicon nitride (SiNx) having a refractive index set from 1.8 to 1.9 used in an interlayer isolation film that electrically isolates a pixel electrode and a common electrode from each other. Examples of the other members include an organic optical thin film such as a liquid crystal, an alignment film, a polarizer, or a retardation film, or a glass substrate, and the refractive index thereof is from about 1.4 to about 1.6.

The reflection loss between media having different refractive indexes may be effectively reduced by inserting various reflections preventing layers therebetween. As a representative reflection preventing layer, a multi-layer film such as a high refractive index layer and a low refractive index layer, a micro-lens array, or the like is used. However, since at least an optical structure having a wavelength order needs to be provided, it is difficult to provide the reflection preventing layer at a gap of about 100 nm at most between the transparent electrode and the liquid crystal layer of the liquid crystal display device. In order to make the thin film thinner and to equally prevent the reflection throughout the visible range, a grated refractive index (Grated Refractive Index, GRIN) thin film is used between the optical thin films having different refractive indexes to smoothly change the refractive index.

For example, the GRIN thin film is used to prevent connection loss at an optical communication fiber connection portion formed of inorganic glass (refer to Technical document 1: "Opt. Commun. 2002 28th Euro. Conf. Opt. Commun. (ECOC2002) 3 (2002) 1-2"), and is used in an external light prevention film formed of $SiO_2$ glass in which the concentration of holes is controlled (refer to Technical document 2: "Appl. Opt. 42 (2003) 4573-4579").

Further, JP 2007-248607 A suggests a structure in which a GRIN thin film formed of a SiOx thin film having a controlled oxidation degree is used in a liquid crystal display element.

SUMMARY OF THE INVENTION

However, since only the external light reflection prevention film formed of $SiO_2$ glass or only the GRIN thin film formed of a SiOx thin film does not exhibit any in-plane anisotropy, it is very difficult to obtain liquid crystal alignment capability. Further, in the structure disclosed in JP 2007-248607 A, there is an attempt to make slight liquid crystal alignment capability by performing oblique vapor deposition using a SiOx thin film alone. However, it is generally known that the oblique vapor deposition film formed of an inorganic material has insufficient liquid crystal alignment capability.

Nowadays, in order to align the liquid crystal molecule, an alignment film formed of an organic material capable of aligning the liquid crystal molecule by interaction at the molecular level is generally used. If the existing liquid crystal alignment film is coated onto the GRIN thin film formed of a SiOx thin film shown in JP 2007-248607 A, a difference in refractive index may be alleviated. However, for example, since a distance from the transparent electrode to the liquid crystal layer becomes longer, the liquid crystal display device is not driven when a voltage necessary for aligning the liquid crystal molecule is not increased, and power consumption increases markedly.

An object of the present invention is to provide a liquid crystal display device having high transmissivity without degrading a low power consumption property or an alignment property of a liquid crystal. Further, the above-mentioned object and other objects, and novel features of the present invention are clarified by the descriptions and the attached drawings of the specification.

According to an aspect of the present invention, there is provided a liquid crystal display device including: first and second substrates, at least one of which is transparent; a liquid crystal layer which is disposed between the first and second substrates; an electrode group which is formed on at least one of the first and second substrates and applies an electric field to the liquid crystal layer; a plurality of active elements which is connected to the electrode group; an alignment film which is disposed on at least one of the first and second substrates and has one surface contacting the liquid crystal layer; and an underlying layer which is disposed on at least one of the first and second substrates and contacts the other surface of the alignment film, wherein the alignment film includes an organic compound, wherein the refractive index of the alignment film monotonically increases from a boundary surface between the alignment film and the liquid crystal layer to a boundary surface between the alignment film and the underlying layer, and wherein the minimum refractive index $n_{LC}$ of the liquid crystal layer, the refractive index $n_{F2}$ of the alignment film at the boundary surface between the liquid crystal layer and the alignment film, the refractive index $n_{F1}$ of the alignment film at the boundary surface between the alignment film and the underlying layer, and the refractive index $n_{S2}$ of the underlying layer have a relationship of an equation (I) in which $n_{LC} \leq n_{F2} < n_{F1} \leq n_{S2}$.

Further, the underlying layer may be a transparent layer through which visible light is transmitted. The electrode group may include a common electrode and a pixel electrode. A surface opposite to a surface contacting the alignment film in the underlying layer may contact any one of the common electrode and the pixel electrode.

The refractive index $n_{S2}$ of the underlying layer and the refractive index $n_{PE}$ of the one electrode at the boundary surface between the underlying layer and the one electrode may have a relationship of an equation (II) in which $|n_{S2} - n_{PE}| \leq 0.1$.

A part of the surface opposite to the surface contacting the alignment film in the underlying layer may contact the one electrode and the other part thereof contacts an interlayer isolation film. The refractive index $n_{S2}$ of the underlying layer and the refractive index $n_{LI}$ of the interlayer isolation film may have a relationship of an equation (III) in which $|n_{S2} - n_{LI}| \leq 0.1$.

The electrode group may include a common electrode and a pixel electrode. The underlying layer may include an interlayer isolation film contacting a surface opposite to a surface contacting the liquid crystal layer in the alignment film and any one of the common electrode and the pixel electrode provided in a part of a surface on the side of the alignment film in the interlayer isolation film and protruding toward the alignment film. The alignment film may be formed on the underlying layer. The film thickness of the alignment film may be larger than that of the one electrode.

The refractive index of the surface of the one electrode may be lower than the internal refractive index. The alignment film may have an in-plane optical anisotropy. The direction of the in-plane optical anisotropic axis of the alignment film may be equal to the alignment regulation direction of the liquid crystal layer.

The alignment film may include a plurality of types of the organic compounds. The alignment film includes a plurality of types of the organic compounds having different polarities. The alignment film includes a plurality of types of the organic compounds having different refractive indexes. In the plurality of types of organic compounds forming the alignment film, the refractive index in the visible range of the organic compound having the highest refractive index may be 1.7 or more.

The alignment film may be formed of polyimide using polyamic acid ester as a precursor. The alignment film may obtain liquid crystal alignment capability by photo-alignment treatment. The alignment film may obtain liquid crystal alignment capability by a rubbing treatment.

Further, an area obtaining liquid crystal alignment capability of the alignment film may be within a range of 20 nm from a surface of the alignment film. Compounds forming the alignment film may be cross-linked to each other after the alignment film obtains liquid crystal alignment capability. The coating ratio with respect to a display area of the alignment film may be 50% or more.

According to the present invention, the liquid crystal display device may be provided which has high transmissivity without degrading a low power consumption property or an alignment property of a liquid crystal. The other effects of the present invention are clarified from the entire description of the specification.

BRIEF DESCRIPTION OF THE DRAWINGS

FIG. 1C is a schematic plan view illustrating an example of a schematic configuration of a liquid crystal display panel in the liquid crystal display device according to the embodiment of the present invention.

FIG. 1D is a schematic cross-sectional view illustrating an example of a cross-sectional configuration taken along the line 1D-1D of FIG. 1C.

DETAILED DESCRIPTION OF THE INVENTION

Figure 1A:
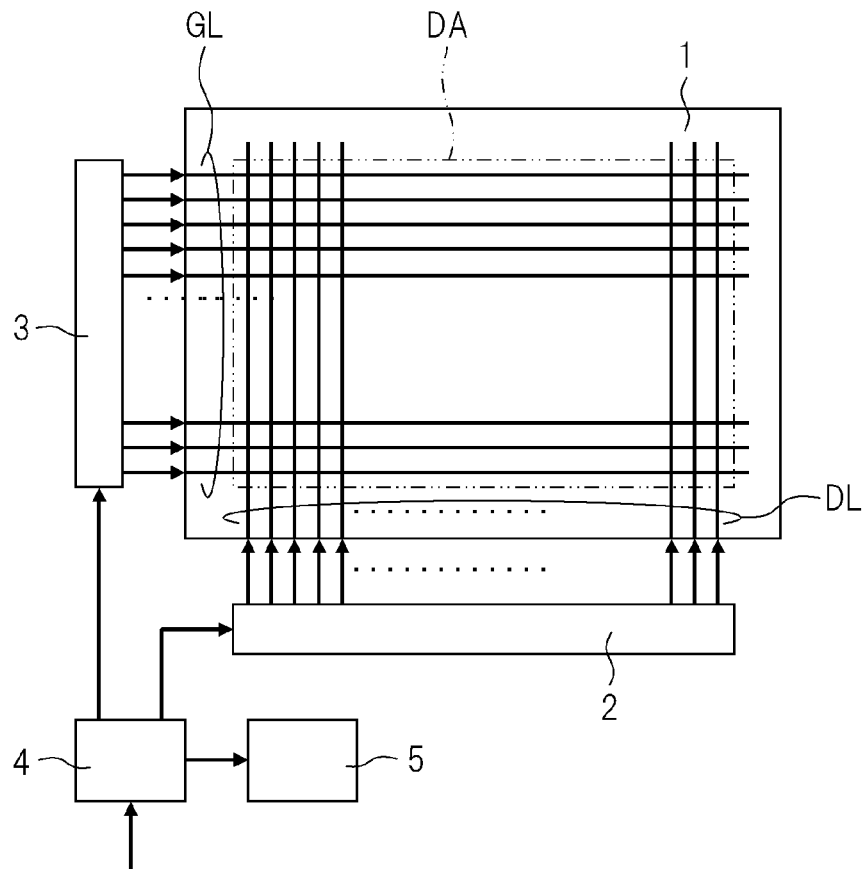
FIG. 1A is a schematic block diagram illustrating an example of a schematic configuration of a liquid crystal display device according to an embodiment of the present invention.

Hereinafter, the present invention will be described in detail by referring to the accompanying drawings. Further, in all drawings used to illustrate the embodiment, the same reference numerals will be given to the components having the same function, and the description thereof will not be repeated.

First, an example of a schematic configuration of a liquid crystal display device according to the present invention will be described by referring to FIGS. 1A to 1D.

Figure 1B:
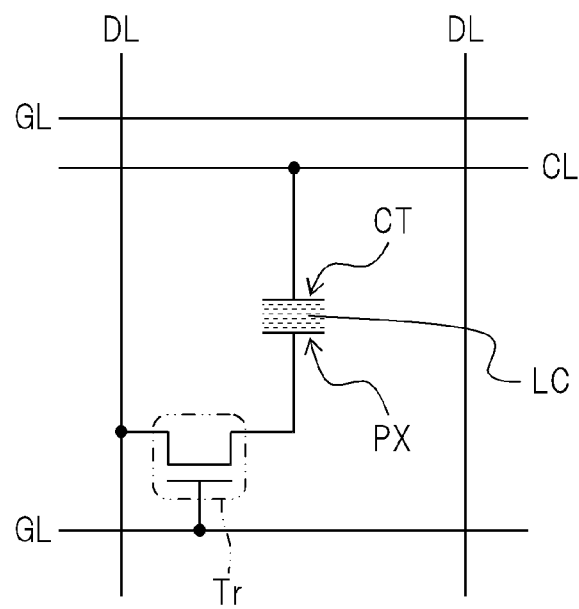
FIG. 1B is a schematic circuit diagram illustrating an example of a circuit configuration of one pixel of a liquid crystal display panel in the liquid crystal display device according to the embodiment of the present invention.

FIG. 1A is a schematic block diagram illustrating an example of a schematic configuration of a liquid crystal display device according to an embodiment of the present invention. FIG. 1B is a schematic circuit diagram illustrating an example of a circuit configuration of one pixel of a liquid crystal display panel in the liquid crystal display device according to the embodiment of the present invention. FIG. 1C is a schematic plan view illustrating an example of a schematic configuration of a liquid crystal display panel in the liquid crystal display device according to the embodiment of the present invention. FIG. 1D is a schematic cross-sectional view illustrating an example of a cross-sectional configuration taken along the line 1D-1D of FIG. 1C.

The present invention is applied to, for example, an active matrix liquid crystal display device. The active matrix liquid crystal display device is used in, for example, a display (monitor) for a portable electronic apparatus, a display for a personal computer, a display for printing or designing, a display for a medical device, a liquid crystal television, and the like.

For example, as shown in FIG. 1A, the active matrix liquid crystal display device includes a liquid crystal display panel 1, a first driving circuit 2, a second driving circuit 3, a control circuit 4, a backlight 5, and the like.

The liquid crystal display panel 1 includes plural scanning signal lines GL (gate lines) and plural video signal lines DL (drain lines), where the video signal lines DL are connected to the first driving circuit 2, and the scanning signal lines GL are connected to the second driving circuit 3. Further, FIG. 1A shows a part of the plural scanning signal lines GL, but in the actual liquid crystal display panel 1, various scanning signal lines GL are further densely disposed. In the same manner, FIG. 1A shows a part of the plural video signal lines DL, and in the actual liquid crystal display panel 1, various video signal lines DL are further densely disposed.

A display area DA of the liquid crystal display panel 1 includes plural pixels. An area of one pixel in the display area DA corresponds to, for example, an area surrounded by two adjacent scanning signal lines GL and two adjacent video signal lines DL. In this case, each pixel has, for example, a circuit configuration shown in FIG. 1B, and includes a TFT element Tr serving as an active element, a pixel electrode PX, a common electrode CT (which may be called a counter electrode), and a liquid crystal layer LC. Here, for example, a common line CL used to share the common electrode CT of the plural pixels is provided in the liquid crystal display panel 1.

For example, as shown in FIGS. 1C and 1D, the liquid crystal display panel 1 has a structure in which alignment films 606 and 705 are respectively formed on surfaces of an active matrix substrate 6 and a counter substrate 7, and liquid crystal layer 11a (liquid crystal material) is disposed between the alignment films. Further, although it is not particularly shown herein, an intermediate layer (for example, an optical intermediate layer such as a light diffusion layer, a color conversion layer, and a retardation film) may be appropriately provided between the alignment film 606 and the active matrix substrate 6 or between the alignment film 705 and the counter substrate 7. Here, the active matrix substrate 6 and the counter substrate 7 are bonded to each other by an annular sealing agent 8 provided outside the display area DA, and the liquid crystal layer 11a is sealed in a space surrounded by the alignment film 606 on the side of the active matrix substrate 6, the alignment film 705 on the side of the counter substrate 7, and the sealing agent 8. In this case, the liquid crystal display panel 1 of the liquid crystal display device including the backlight 5 includes a pair of polarizers 9a and 9b that are disposed to face each other with the active matrix substrate 6, the liquid crystal layer 11a, and the counter substrate 7 interposed therebetween.

Incidentally, the active matrix substrate 6 is a substrate in which the scanning signal lines GL, the video signal lines DL, the active elements (TFT elements Tr), the pixel electrodes PX, and the like are disposed on an isolation substrate such as a glass substrate. When the liquid crystal display panel 1 is of a horizontal electric field driving type such as an IPS type, the common electrode CT and the common line CL are disposed on the active matrix substrate 6.

Further, when the liquid crystal display panel 1 is a vertical electric field driving type such as a TN type or a VA (Vertically Alignment) type, the common electrode CT is disposed on the counter substrate 7. In the case of the vertical electric field driving type liquid crystal display panel 1, the common electrode CT is generally formed as one plane-shaped electrode that has a large area and is shared by all pixels, and the common line CL is not provided thereon.

Further, in the liquid crystal display device according to the present invention, for example, plural columnar spacers 10 are provided in the space where the liquid crystal layer 11a is sealed in order to equalize the thickness (which may be called a cell gap) of the liquid crystal layer 11a for each pixel. The plural columnar spacers 10 are provided on, for example, the counter substrate 7.

The first driving circuit 2 is a driving circuit that generates a video signal (which may be called a grayscale voltage) applied to the pixel electrode PX of each pixel via the video signal lines DL, and also a driving circuit generally called a source driver, a data driver, and the like. Further, the second driving circuit 3 is a driving circuit that generates a scanning signal applied to the scanning signal lines GL, and also a driving circuit generally called a gate driver, a scanning driver, and the like. The control circuit 4 is a circuit that controls the operation of the first driving circuit 2, the operation of the second driving circuit 3, and the luminance of the backlight 5, and also a control circuit generally called a TFT controller, a timing controller, and the like.

Further, the backlight 5 is, for example, alight source such as a light emitting diode (LED) or a fluorescent light such as a cold cathode fluorescent light, and light emitted from the backlight 5 is converted into planar light by a reflection plate, a light guiding plate, a light diffusion plate, a prism sheet, and the like which are not shown in the drawings to be emitted to the liquid crystal display panel 1. When light is emitted from the backlight 5, the light passes through various layers provided in the liquid crystal display panel 1.

The liquid crystal display device according to the embodiment of the present invention is a liquid crystal display device that includes: the active matrix substrate (the first substrate) 6 and the counter substrate (the second substrate) 7, anyone of the first and second substrates formed to be transparent; the liquid crystal layer 11a disposed between the active matrix substrate 6 and the counter substrate 7; the electrode groups CT and PX formed on at least one of the active matrix substrate 6 and the counter substrate 7 to apply an electric field 12 to the liquid crystal layer 11a; the plural active elements Tr connected to the electrode groups CT and PX; the alignment films 606 and 705 disposed on at least one of the active matrix substrate 6 and the counter substrate 7 and contacting the liquid crystal layer 11a at one surface thereof; and an underlying layer contacting the other surfaces of the alignment films 606 and 705 in at least one of the active matrix substrate 6 and the counter substrate 7.

Reflection loss occurs at a boundary surface when the light emitted from the backlight 5 is transmitted through the boundary surface of two layers having different refractive indexes. The reflection loss becomes more prominent as a difference in refractive index becomes larger. Particularly, the reflection loss becomes prominent when the reflection loss is caused by the reflection from the boundary surface of the interlayer isolation film or the electrode groups CT and PX having high refractive index.

For example, when the liquid crystal display device according to the embodiment of the present invention is a so-called horizontal electric field driving type liquid crystal display device such as an IPS, the electrode groups CT and PX are formed only on one substrate (the active matrix substrate 6). In this case, the reflection loss in the active matrix substrate 6 may be effectively suppressed when the alignment film according to the present invention is applied to the alignment film 606 provided in the active matrix substrate 6.

Further, in the case of a vertical electric field driving type liquid crystal display device, one electrode group (the pixel electrodes PX) and the other electrode group (the common electrodes CT) are respectively formed on the active matrix substrate 6 and the counter substrate 7. In this case, the alignment film according to the present invention may be effectively applied to the alignment films 606 and 705 respectively provided in the active matrix substrate 6 and the counter substrate 7.

In the following description, when the liquid crystal display device according to the embodiment of the present invention is the horizontal electric field driving type liquid crystal display device, the alignment film 606 provided in the active matrix substrate 6 will be described in detail. Incidentally, even in the horizontal electric field driving type liquid crystal display device, the alignment according to the present invention may be applied to the alignment film 705 provided in the counter substrate 7.

Further, when the liquid crystal display device according to the embodiment of the present invention is the vertical electric field driving type liquid crystal display device, the alignment film according to the present invention may be effectively applied to the alignment films 606 and 705 respectively provided on the active matrix substrate 6 and the counter substrate 7. However, in the following description, the detailed description of the configuration of the counter substrate 7 will be omitted.

Figure 2A:
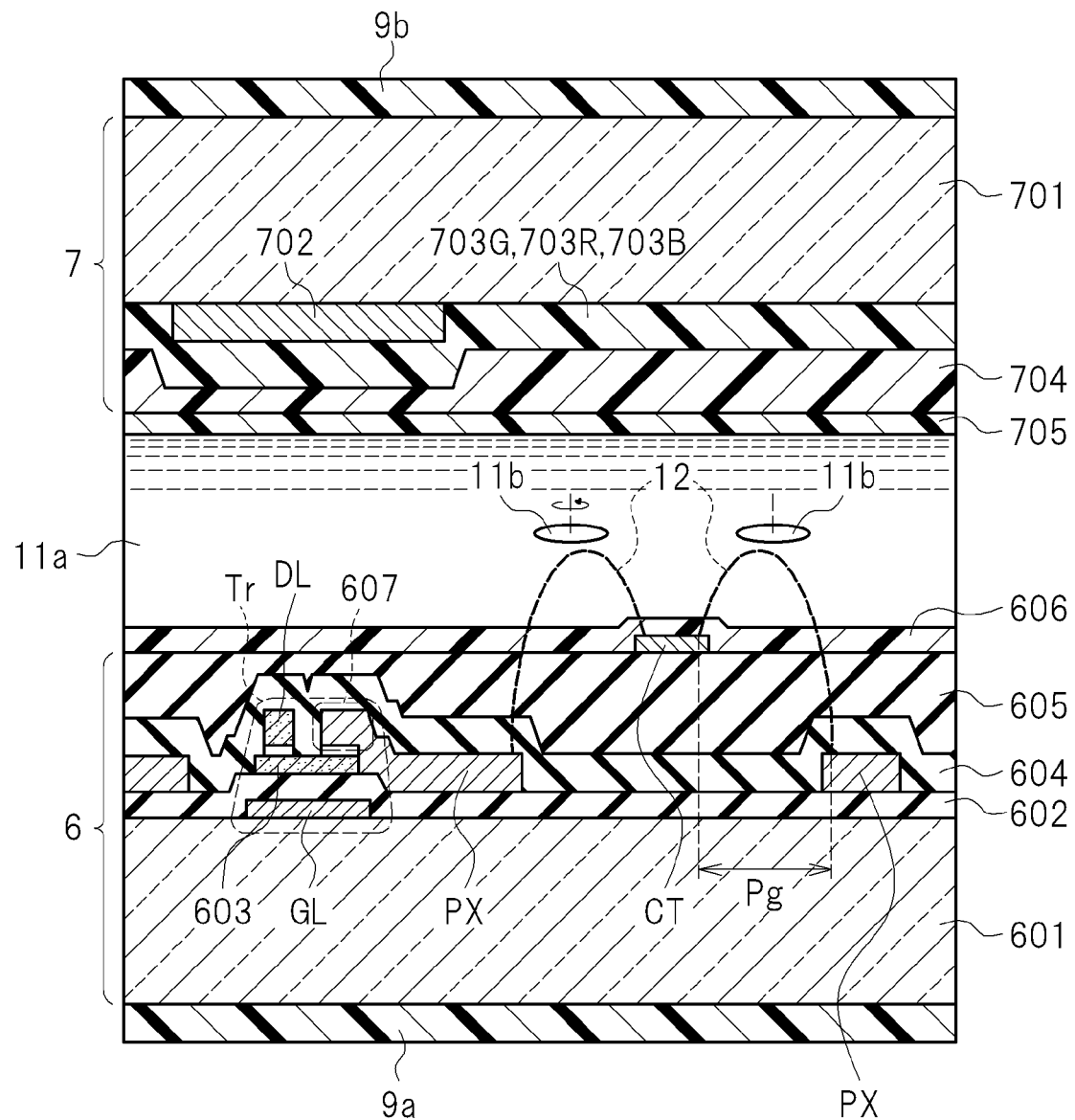
FIG. 2A is a schematic cross-sectional view illustrating an example of a schematic configuration of an IPS type liquid crystal display panel in the liquid crystal display device according to the embodiment of the present invention.

FIG. 2A is a schematic cross-sectional view illustrating an example of a schematic configuration of an IPS type liquid crystal display panel in the liquid crystal display device according to the embodiment of the present invention.

The liquid crystal display device according to the example of FIG. 2A is a liquid crystal display device that includes: the active matrix substrate (the first substrate) 6 and the counter substrate (the second substrate) 7, any one of the first and second substrates formed to be transparent; the liquid crystal layer 11a disposed between the active matrix substrate 6 and the counter substrate 7; the pixel electrode PX and the common electrode CT formed on one (the active matrix substrate 6) of the active matrix substrate 6 and the counter substrate 7 to apply the electric field 12 to the liquid crystal layer 11a; the active element Tr connected to the pixel electrode PX; and the alignment films 606 and 705 respectively disposed on the active matrix substrate 6 and the counter substrate 7.

In this example, the alignment film 606 provided in the active matrix substrate 6 includes an organic compound. The refractive index of the alignment film 606 monotonically increases from the boundary surface between the alignment film 606 and the liquid crystal layer 11a to the boundary surface between the alignment film 606 and the underlying layer. The minimum refractive index $n_{LC}$ of the liquid crystal layer 11a, the refractive index $n_{F2}$ of the alignment film 606 at the boundary surface between the liquid crystal layer 11a and the alignment film 606, the refractive index $n_{F1}$ of the alignment film 606 at the boundary surface between the alignment film 606 and the underlying layer, and the refractive index $n_{S2}$ of the underlying layer have a relationship of a following equation (I).

$$n_{LC} \leq n_{F2} < n_{F1} \leq n_{S2} \qquad (I)$$

Here, the underlying layer is a layer that is formed to contact the opposite side of the liquid crystal layer 11a in the alignment film 606. That is, one surface of the alignment film 606 contacts the liquid crystal layer 11a, and the other surface thereof contacts the underlying layer. The underlying layer of the liquid crystal display device shown in FIG. 2A is an interlayer isolation film 605 and the common electrode CT. For example, the underlying layer may be formed to spread on one surface of the liquid crystal panel like the interlayer isolation film 605, or may be formed in a specific pattern like the common electrode CT.

Further, even when the underlying layer includes at least two types of layers (for example, the interlayer isolation film 605 and the common electrode CT), the refractive index $n_{S2}$ of each of two or more types of layers forming the underlying layer at the boundary surface contacting the alignment film 606 satisfies the relationship of the equation (I).

Further, the alignment films 606 and 705 directly contacting the liquid crystal layer 11a are formed of an organic compound having thermal resistance and mainly including polyimide. The liquid crystal material forming the liquid crystal layer 11a is formed by using a nematic liquid crystal mixture. When the liquid crystal material is a positive liquid crystal, the refractive index no in the normal optical direction is about 1.7, and the refractive index ne in the abnormal optical direction is about 1.5. On the contrary, when the liquid crystal material is a negative liquid crystal, the no is about 1.5, and the ne is about 1.7. The minimum refractive index $n_{LC}$ of the liquid crystal layer shown in the above-described equation (I) indicates the smaller value among the refractive index no in the normal optical direction of liquid crystal molecules forming the liquid crystal layer and the refractive index ne in the abnormal optical direction. For example, in the minimum refractive index $n_{LC}$ of the liquid crystal layer formed of a positive liquid crystal, the refractive index ne in the abnormal optical direction is 1.5.

The active matrix substrate 6 has a structure in which the scanning signal lines GL, the common line CL, and a first isolation film 602 covering the lines are formed on a surface of an isolation substrate such as a glass substrate 601. The semiconductor layer 603 of the TFT element Tr, the video signal lines DL, the pixel electrodes PX, and a second isolation film 604 covering the layers, the lines, and the electrodes are formed on the first isolation film 602. The semiconductor layer 603 is disposed on the scanning signal lines GL, and a portion located below the semiconductor layer 603 in the scanning signal lines GL serves as a gate electrode of the TFT element Tr.

Further, the semiconductor layer 603 has, for example, a structure in which a source diffusion layer and a drain diffusion layer formed of second amorphous silicon having different types of impurities or different concentrations of impurities from a first amorphous silicon are laminated on an active layer (channel formation layer) formed of the first amorphous silicon. In this case, a part of the video signal lines DL and a part of the pixel electrodes PX are disposed on the semiconductor layer 603, and the portions disposed on the semiconductor layer 603 respectively serve as the drain electrode and the source electrode of the TFT element Tr.

Here, the source and the drain of the TFT element Tr are switched in accordance with a relationship of bias, that is, a relationship of difference between the potential of the pixel electrode PX and the potential of the video signal line DL when turning on the TFT element Tr. However, in the following description of the specification, an electrode connected to the video signal line DL is referred to as a drain electrode, and an electrode connected to the pixel electrode PX is referred to as a source electrode.

An interlayer isolation film 605 (overcoat layer) having a planarized surface is formed on the second isolation film 604. The common electrode CT and the alignment film 606 covering the common electrode CT and the interlayer isolation film 605 are formed on the interlayer isolation film 605. The common electrode CT is connected to the common line CL via a contact hole CH (through hole) penetrating the first isolation film 602, the second isolation film 604, and the interlayer isolation film 605.

Further, as shown in FIG. 2A, the electrode group included in the active matrix substrate 6 includes the common electrode CT and the pixel electrode PX. The above-described underlying layer includes the interlayer isolation film 605 contacting the surface opposite to the surface contacting the liquid crystal layer 11a of the alignment film 606, and the common electrode CT provided in a part of the surface of the interlayer isolation film 605 on the side of the alignment film 606 to protrude toward the alignment film 606. The alignment film 606 is formed on the underlying layer (the interlayer isolation film 605 and the common electrode CT), and the film thickness of the alignment film 606 is larger than that of the common electrode CT.

When the film thickness of the alignment film 606 is set to be larger than that of the common electrode CT, unevenness of the common electrode CT formed on the upper surface of the interlayer isolation film 605 may be reduced, and hence the reflection loss originated from the unevenness of the common electrode CT may be suppressed, which is desirable in the improvement in transmissivity.

Further, the common electrode CT is set so that a gap Pg with respect to the pixel electrode PX in the plan view is set to, for example, about 7 µm. A polymer material to be described in the examples below is coated onto the alignment film 606, and a surface treatment (a rubbing treatment or the like) is performed on the surface to obtain a liquid crystal alignment property.

On the other hand, the counter substrate 7 has a structure in which a black matrix 702, color filters 703R, 703G, 703B, and an overcoat layer 704 covering the black matrix and the color filters are formed on a surface of an isolation substrate such as a glass substrate 701. The black matrix 702 is, for example, a light shielding film that is formed in a lattice shape and is used to form an opening area by the unit of pixel in the display area DA. Further, each of the color filters 703R, 703G, 703B is a film that allows only the transmission of light having a specific wavelength area (color) among white light emitted from the backlight 5. When the liquid crystal display device corresponds to an RGB type color display, the color filter 703R allowing the transmission of red light, the color filter 703G allowing the transmission of green light, and the color filter 703B allowing the transmission of blue light are disposed (here, the pixel of one color is representatively shown).

Further, the overcoat layer 704 has a planarized surface. The plural columnar spacers 10 and the alignment film 705 are formed on the overcoat layer 704. The columnar spacer 10 has, for example, a top portion that is formed in a flat conical trapezoid shape (which may be called a trapezoid rotation body), and is formed at a position overlapping with a portion except for a portion intersecting the video signal line DL and the portion having the TFT element Tr among the scanning signal lines GL of the active matrix substrate 6.

Further, the alignment film 705 is formed of, for example, a polyimide resin, and a surface treatment (a rubbing treatment or the like) is performed on the surface to obtain a liquid crystal alignment property. Further, when there is no application of an electric field in which the potentials of the pixel electrode PX and the common electrode CT are equal to each other, the liquid crystal molecule 11b of the liquid crystal layer 11a in the liquid crystal display panel 1 of FIG. 2A is aligned to be substantially parallel to the surfaces of the glass substrates 601 and 701, and is homogenously aligned in the direction facing the initial alignment direction defined by the rubbing treatment performed on the alignment films 606 and 705.

Then, when the TFT element Tr is turned on to write the grayscale voltage applied to the video signal line DL into the pixel electrode PX, so that a difference in potential occurs between the pixel electrode PX and the common electrode CT, the electric field 12 (line of electrical force) is generated as shown in the drawing, and the electric field 12 having a strength in accordance with a difference in potential between the pixel electrode PX and the common electrode CT is applied to the liquid crystal molecule 11b. Here, due to the interaction of the electric field 12 and dielectric anisotropy of the liquid crystal layer 11a, the direction of the liquid crystal molecule 11b forming the liquid crystal layer 11a changes to the direction of the electric field 12, so that refraction anisotropy of the liquid crystal layer 11a changes. In this case, the direction of the liquid crystal molecule 11b is determined by the strength (the largeness of a difference in potential between the pixel electrode PX and the common electrode CT) of the applied electric field 12. Accordingly, in the liquid crystal display device, for example, the potential of the common electrode CT is fixed, and the grayscale voltage applied to the pixel electrode PX is controlled for every pixel to change the light transmissivity of each pixel, thereby displaying a video or an image.

Figure 2B:
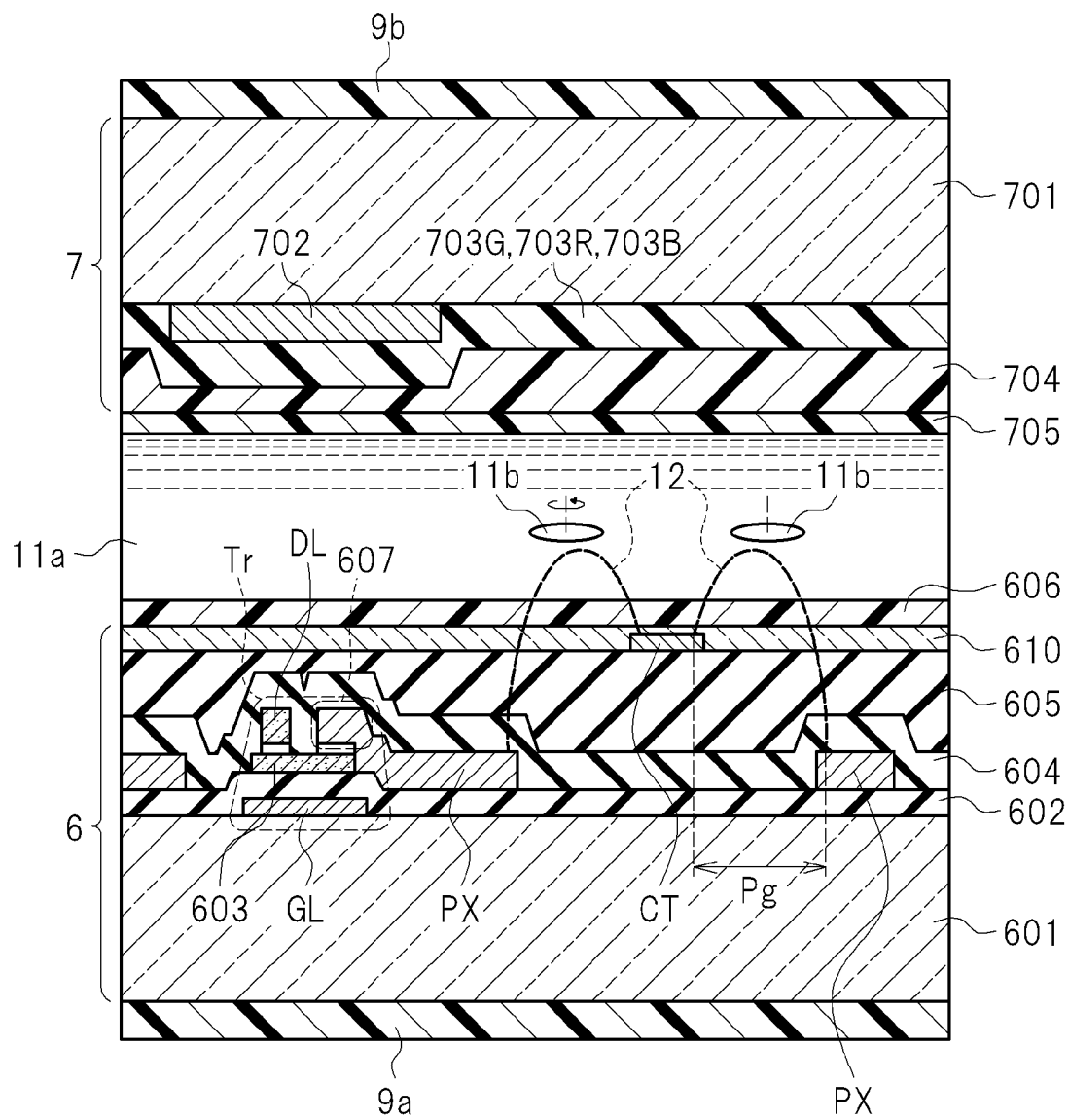
FIG. 2B is a schematic cross-sectional view illustrating an example of a schematic configuration of the IPS type liquid crystal display panel in another example of the liquid crystal display device according to the embodiment of the present invention.

FIG. 2B is a schematic cross-sectional view illustrating an example of a schematic configuration of the IPS type liquid crystal display panel in another example of the liquid crystal display device according to the embodiment of the present invention. A transparent layer 610 is formed on the common electrode CT in the liquid crystal display device shown in FIG. 2A, and the alignment film 606 is formed on the transparent layer 610. Further, the transparent layer 610 is used to planarize the unevenness caused by the step of the common electrode CT in the display area, and suppresses the reflection loss originated from the unevenness of the common electrode CT.

The underlying layer of the liquid crystal display device shown in FIG. 2B is the transparent layer 610 through which visible light (an electromagnetic wave having a wavelength range from 380 nm to 750 nm) is transmitted. The transparent layer 610 contacts the surface opposite to the surface contacting the liquid crystal layer 11a of the alignment film 606 in the active matrix substrate 6. A part of the surface opposite to the surface contacting the alignment film 606 of the underlying layer contacts the common electrode CT. Further, the refractive index $n_{S2}$ of the transparent layer 610 as the underlying layer and the refractive index $n_{PE}$ of the common electrode CT at the boundary surface between the transparent layer 610 and the common electrode CT may have a relationship of a following equation (II).

$$|n_{s2}-n_{PE}|\leq 0.1 \quad (II)$$

When a difference between the refractive index $n_{S2}$ of the transparent layer 610 as the underlying layer and the refractive index $n_{PE}$ of the common electrode CT is 0.1 or less, the reflection loss originated from the interlayer reflection between the transparent layer 610 and the common electrode CT may be reduced, so that the transmissivity may be desirably improved. Further, when the refractive index $n_{S2}$ of the transparent layer 610 is equal to the refractive index $n_{PE}$ of the common electrode CT, the reflection loss originated from the interlayer reflection between the transparent layer 610 and the common electrode CT may be particularly reduced, so that the transmissivity may be particularly desirably improved.

Incidentally, the refractive index $n_{PE}$ of the common electrode CT at the boundary surface between the transparent layer 610 and the common electrode CT may be set to be lower than the internal refractive index. Further, when the common electrode CT is uniform, the refractive index of the surface of the common electrode CT may be set to be equal to the internal refractive index.

In the liquid crystal display device shown in FIG. 2B, a part of the surface opposite to the surface contacting the alignment film 606 of the transparent layer 610 as the underlying layer contacts the common electrode CT, and the other part contacts the interlayer isolation film 605. The refractive index $n_{S2}$ of the transparent layer 610 and the refractive index $n_{LI}$ of the interlayer isolation film 605 may have a relationship of a following equation (III).

$$|n_{s2}-n_{LI}|\leq 0.1 \quad (III)$$

When a difference between the refractive index $n_{S2}$ of the transparent layer as the underlying layer and the refractive index $n_{LI}$ of the interlayer isolation film 605 is 0.1 or less, the reflection loss originated from the interlayer reflection between the transparent layer 610 and the interlayer isolation film 605 may be reduced, so that the transmissivity may be desirably improved. Further, when the refractive index $n_{S2}$ of the transparent layer 610 is equal to the refractive index $n_{LI}$ of the interlayer isolation film 605, the reflection loss originated from the interlayer reflection between the transparent layer 610 and the interlayer isolation film 605 may be particularly reduced, so that the transmissivity may be particularly desirably improved.

Figure 3:
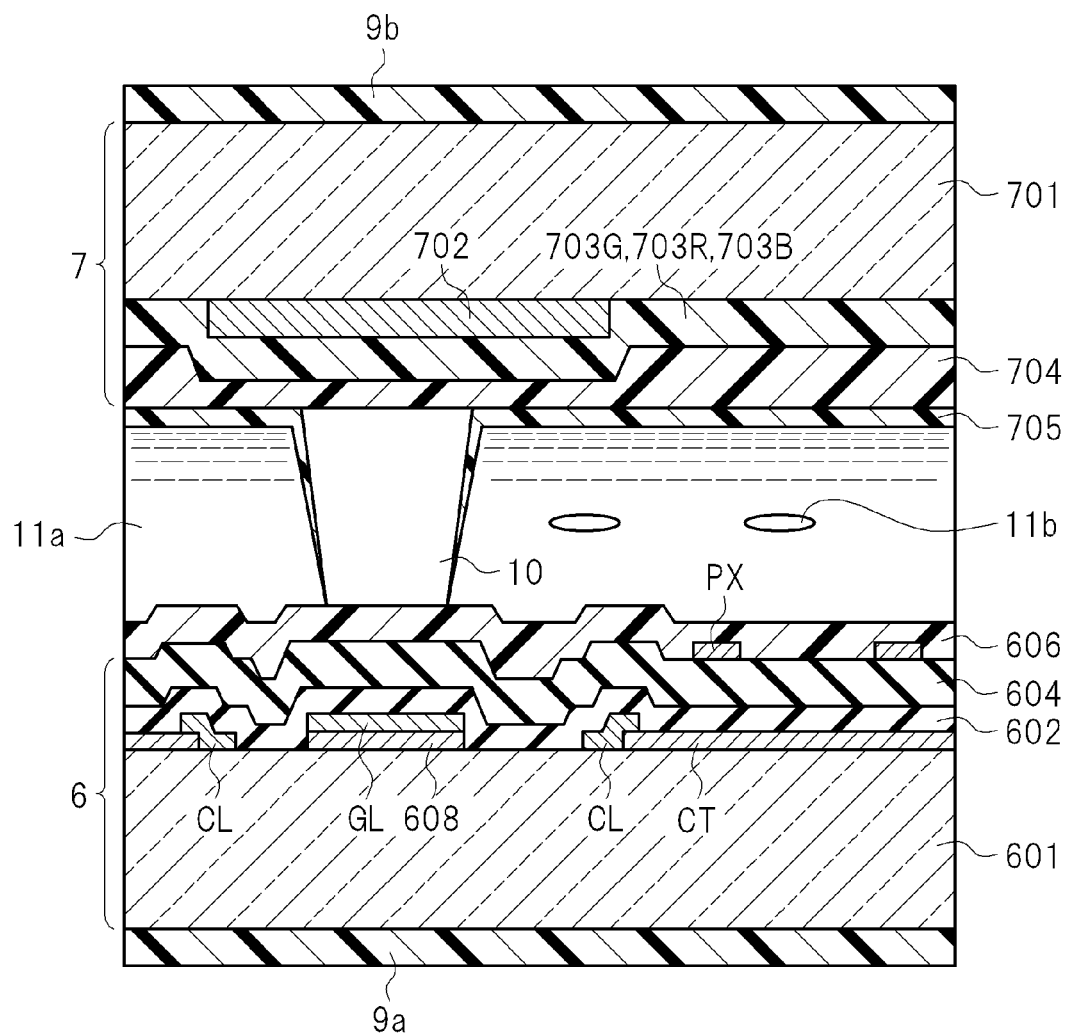
FIG. 3 is a schematic cross-sectional view illustrating an example of a schematic configuration of an FFS type liquid crystal display panel in the liquid crystal display device according to the embodiment of the present invention.

FIG. 3 is a schematic cross-sectional view illustrating an example of a schematic configuration of an FFS type liquid crystal display panel in the liquid crystal display device according to the embodiment of the present invention. The liquid crystal display device according to the example of FIG. 3 is a liquid crystal display device that includes: the active matrix substrate (the first substrate) 6 and the counter substrate (the second substrate) 7, any one of the first and second substrates formed to be transparent; the liquid crystal layer 11a disposed between the active matrix substrate 6 and the counter substrate 7; the pixel electrode PX and the common electrode CT formed on one (the active matrix substrate 6) of the active matrix substrate 6 and the counter substrate 7 to apply the electric field 12 to the liquid crystal layer 11a; the active element connected to the pixel electrode; and the alignment films 606 and 705 respectively disposed on the active matrix substrate 6 and the counter substrate 7.

The underlying layer of the liquid crystal display device shown in FIG. 3 is the second isolation film 604 and the pixel electrode PX. Further, the refractive index $n_{S2}$ of each of the second isolation film 604 and the pixel electrode PX forming the underlying layer at the boundary surface contacting the alignment film 606 satisfies the relationship of the equation (I).

The active matrix substrate 6 has a structure in which the common electrode CT, the scanning signal lines GL, the common line CL, and the first isolation film 602 covering the electrodes and the lines are formed on a surface of an isolation substrate such as the glass substrate 601. The semiconductor layer 603 of the TFT element, the video signal line DL, the source electrode, and the second isolation film 604 covering the layers, the lines, and the electrodes are formed on the first isolation film 602. In this case, a part of the video signal lines DL and a part of the source electrodes are disposed on the semiconductor layer 603, and the portions disposed on the semiconductor layer 603 respectively serve as the drain electrode and the source electrode of the TFT element.

Further, in the liquid crystal display panel 1 of FIG. 3, the interlayer isolation film 605 is not provided, and the pixel electrode PX and the alignment film 606 covering the pixel electrode PX are provided on the second isolation film 604. The pixel electrode PX is connected to the source electrode via the contact hole CH (through hole) penetrating the second isolation film 604. Here, the common electrode CT formed on the surface of the glass substrate 601 is formed in a plane shape at an area (opening area) surrounded by two adjacent scanning signal lines GL and two adjacent video signal lines DL, and the pixel electrode PX having plural slits is laminated on the plane-shaped common electrode CT. In this case, the common electrode CT of the pixels arranged in the extension direction of the scanning signal lines GL is shared by the common line CL.

On the other hand, the counter substrate 7 of the liquid crystal display panel 1 of FIG. 3 has the same configuration as that of the counter substrate 7 of the liquid crystal display panel of FIG. 2. Accordingly, the detailed description of the configuration of the counter substrate 7 will not be repeated.

Figure 4:
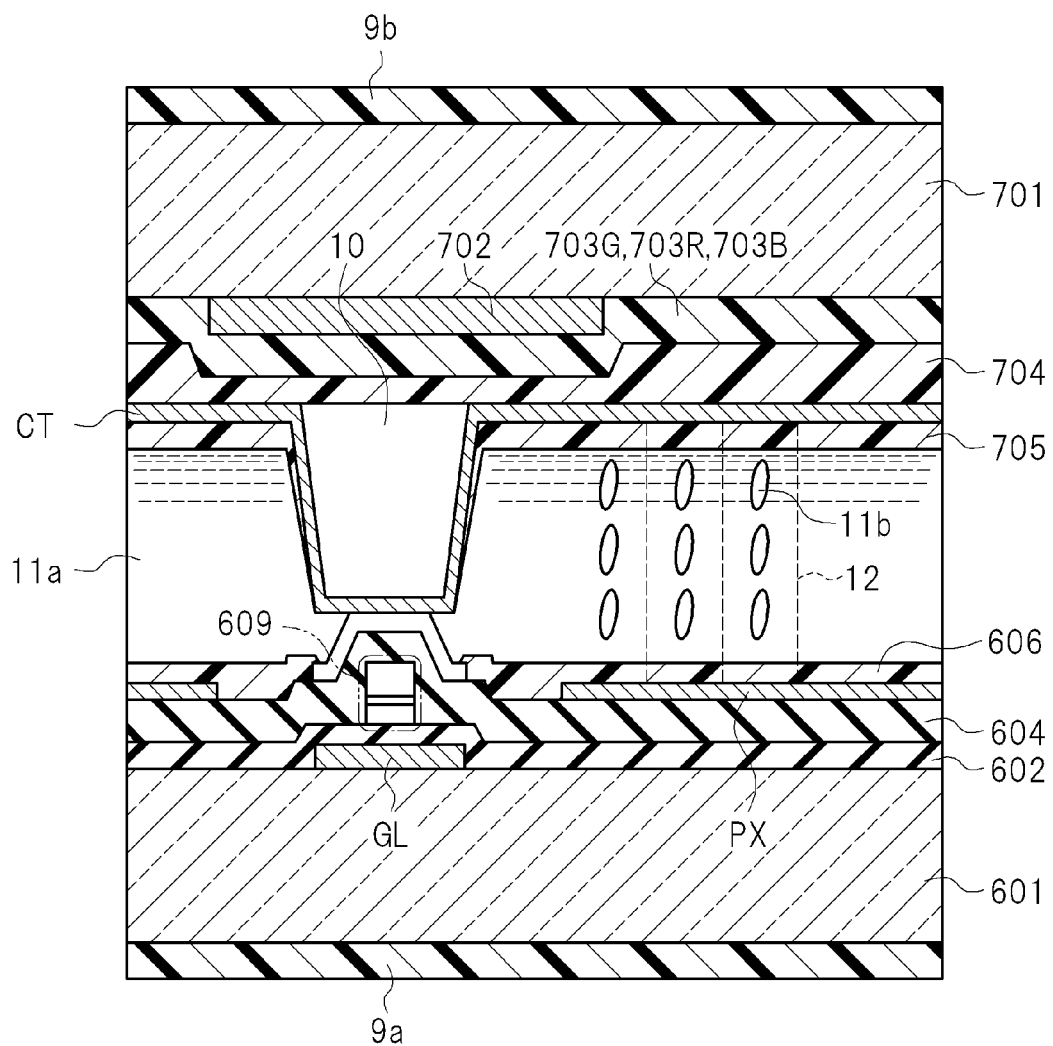
FIG. 4 is a schematic cross-sectional view illustrating an example of a schematic configuration of a VA type liquid crystal display panel in the liquid crystal display device according to the embodiment of the present invention.

FIG. 4 is a schematic cross-sectional view illustrating an example of a schematic configuration of a VA type liquid crystal display panel in the liquid crystal display device according to the embodiment of the present invention.

The liquid crystal display device according to the example of FIG. 4 is a liquid crystal display device that includes: the active matrix substrate (the first substrate) 6 and the counter substrate (the second substrate) 7, any one of the first and second substrates formed to be transparent; the liquid crystal layer 11a disposed between the active matrix substrate 6 and the counter substrate 7; the pixel electrode PX and the common electrode CT respectively formed on the active matrix substrate 6 and the counter substrate 7 to apply the electric field 12 to the liquid crystal layer 11a; the active element Tr connected to the pixel electrode PX; and the alignment films 606 and 705 respectively disposed on the active matrix substrate 6 and the counter substrate 7.

The underlying layer of the liquid crystal display device shown in FIG. 4 is the second isolation film 604 and the pixel electrode PX. Further, the refractive index $n_{S2}$ of each of the second isolation film 604 and the pixel electrode PX forming the underlying layer at the boundary surface contacting the alignment film 606 satisfies the relationship of the equation (I).

For example, as shown in FIG. 4, the vertical electric field driving type liquid crystal display panel 1 has a structure in which the pixel electrode PX is formed on the active matrix substrate 6, and the common electrode CT is formed on the counter substrate 7.

In the VA type liquid crystal display panel 1 as one of the vertical electric field driving types, each of the pixel electrode PX and the common electrode CT is formed in a solid shape (a simple plane shape) by, for example, a transparent conductive material such as an ITO. In this case, when there is no application of the potential in which the potentials of the pixel electrode PX and the common electrode CT are equal to each other, the liquid crystal molecules 11b are arranged in the direction perpendicular to the surfaces of the glass substrates 601 and 701 by the alignment films 606 and 705.

Then, when a difference in potential occurs between the pixel electrode PX and the common electrode CT, the electric field 12 (line of electrical force) is generated so as to be substantially perpendicular to the glass substrates 601 and 701, and the liquid crystal molecules 11b fall down to the direction parallel to the glass substrates 601 and 701, so that the polarization state of incident light changes. At this time, the direction of the liquid crystal molecule 11b is determined in accordance with the strength of the applied electric field 12. Accordingly, in the liquid crystal display device, for example, the potential of the common electrode CT is fixed, and the video signal (grayscale voltage) applied to the pixel electrode PX is controlled for every pixel to change the light transmissivity of each pixel, thereby displaying a video or an image.

Further, the configuration of the pixel in the VA type liquid crystal display panel 1, for example, the shape of TFT element or the pixel electrode PX in the plan view may be variously set as widely known, and the configuration of the pixel in the liquid crystal display panel 1 of FIG. 4 may be set as any one of them. Here, the detailed description of the configuration of the pixel of the liquid crystal display panel 1 will be omitted.

The present invention relates to the liquid crystal display panel 1 in the above-described active matrix liquid crystal display device, and particularly, to a configuration of a portion contacting the liquid crystal panel 11a in the active matrix substrate 6 and the counter substrate 7, and the periphery thereof. Therefore, the detailed description of the configuration of the first driving circuit 2, the second driving circuit 3, the control circuit 4, and the backlight 5 not directly involved with the present invention will be omitted.

Here, the components included in the liquid crystal display device according to the embodiment of the present invention will be described.

As described above, the liquid crystal layer 11a is filled with a liquid crystal material such as a nematic liquid crystal mixture in many cases. However, in the case of the refractive index of the positive liquid crystal, the refractive index no in the normal optical direction is about 1.7, and the refractive index ne in the abnormal optical direction is about 1.5. On the contrary, in the case of the negative liquid crystal, the no is about 1.5, and the ne is about 1.7.

Further, the refractive index of polyimide used in the alignment film is about 1.6. On the contrary, regarding a thin film layer located at the further lower side of the alignment film, for example, there is the common electrode CT or the pixel electrode PX below the alignment film 606 below the liquid crystal layer 11a in the IPS type liquid crystal display element of FIG. 2A, and the electrodes are isolated by the isolation films 604 and 605.

The common electrode CT or the pixel electrode PX is formed of a sputtering film of ITO as a transparent electrode in many cases, and the refractive index thereof is about 2.1. Further, as the isolation films 604 and 605, a CVD (Chemical Vapor Deposition) film of SiNx is used in many cases, and the refractive index thereof is from about 1.8 to about 1.9. As the glass substrate therebelow, alkali-free glass is used in many cases, and the refractive index thereof is about 1.5.

That is, the active matrix substrate 6 has a structure in which a thin film layer (the common electrode CT, the isolation film 604, or the like) having a high refractive index such as to be 1.8 or more is interposed between thin film layers (the liquid crystal layer 11a, the glass substrate 601, and the like) having a low refractive index such as to be from 1.5 to 1.7. It is important to suppress the reflection loss originated from a difference in interlayer refractive index in order to improve the transmissivity.

On the other hand, the alignment film 705, the overcoat layer 704, and color filters 703R, 703G, 703B are present above the liquid crystal layer 11a, and all of them are formed of an organic compound, where the refractive index thereof is from about 1.5 to about 1.6. Further, a glass substrate 701 thereabove is formed of alkali-free glass in many cases, and the refractive index thereof is about 1.5. That is, the counter substrate 7 above the liquid crystal layer is formed as a member having a low refractive index such as to be from 1.5 to 1.6, and the reflection loss originated from a difference in refractive index is small.

The FFS type liquid crystal display element shown in FIG. 3 has substantially the same configuration. Further, in the VA type liquid crystal display element of FIG. 4, the common electrode CT formed as a transparent electrode is present not only above the liquid crystal layer 11a, but also therebelow. Here, a problem may arise due to the reflection loss originated from a difference in refractive index between the common electrode CT and the overcoat layer 704 or the alignment film 705.

Figure 5A:
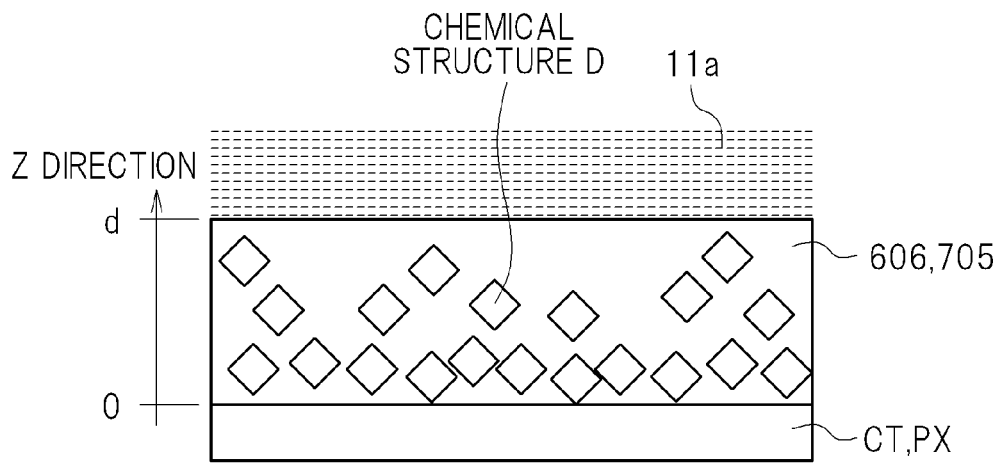
FIG. 5A is a schematic view illustrating an example of a structure in the vicinity of an alignment film in the liquid crystal display device according to the embodiment of the present invention.

FIG. 5A is a schematic view illustrating an example of a structure in the vicinity of an alignment film in the liquid crystal display device according to the embodiment of the present invention, which is suitable to solve such a problem.

One side of the alignment film 606 (or 705) is provided with the liquid crystal layer 11a, and the other side thereof is provided with the common electrode CT or the pixel electrode PX. The alignment film 606 (or 705) of the liquid crystal may be desirably formed of a representative organic compound such as polyimide from the viewpoint that the alignment regulation force is obtained. Generally, the refractive index of the alignment film including the organic compound is about 1.6. That is, there is only a difference of about 0.1 with respect to the refractive index of the liquid crystal layer 11a, but there is a difference of about 0.5 with respect to the ITO used in the common electrode CT or the pixel electrode PX.

In the liquid crystal display device according to the embodiment of the present invention, a chemical structure D is adopted in the alignment film 606 (or 705) including the organic compound in order to improve the refractive index. For example, as shown in FIG. 5D, the concentration of the chemical structure D is set to be high (concentration $C_0$) at the position z=0 (the boundary surface between the alignment film 606 (or 705) and the liquid crystal 11a) in the film thickness direction, and set to be low (concentration $C_d$) at the position z=d (the boundary surface between the alignment film 606 (or 705) and the common electrode CT (or the pixel electrode PX)) in the film thickness direction, thereby forming the alignment film 606 (or 705) having a grated refractive index distribution layer without degrading the alignment property of the liquid crystal. Incidentally, the film thickness direction indicates the direction straight to the surface of the alignment film, and is aligned from one alignment film 606 (or 705) to the other alignment film 705 (or 606).

Figure 5B:
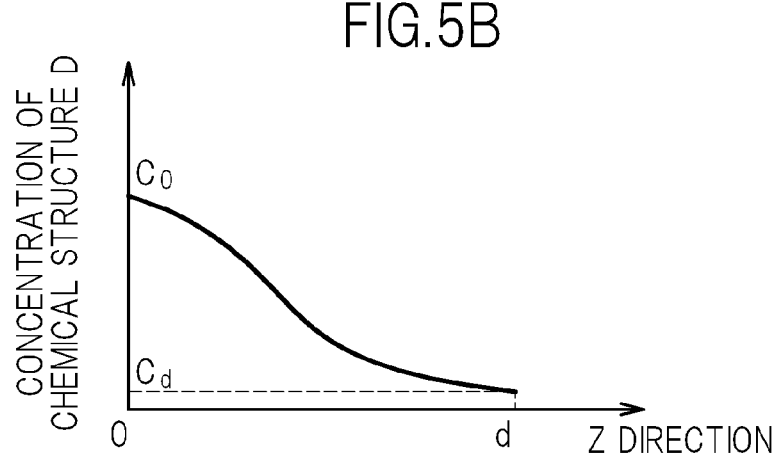
FIG. 5B is an explanatory diagram illustrating an example of a concentration distribution of a chemical structure D included in the alignment film provided in the liquid crystal display device according to the embodiment of the present invention.
Figure 5C:
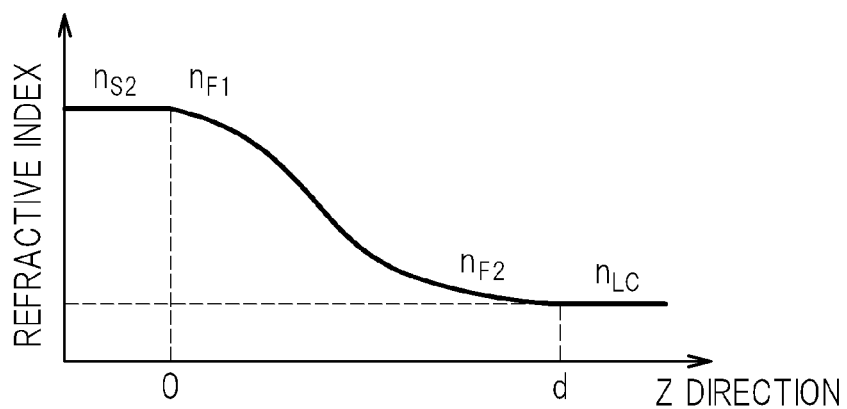
FIG. 5C is an explanatory diagram illustrating an example of a refractive index distribution in the vicinity of the alignment film provided in the liquid crystal display device according to the embodiment of the present invention.

In the alignment film having the grated refractive index distribution layer, for example, as shown in FIG. 5C, the minimum refractive index $n_{LC}$ of the liquid crystal layer 11a, the refractive index $n_{F2}$ of the alignment film 606 at the boundary surface between the liquid crystal layer 11a and the alignment film 606, the refractive index $n_{F1}$ of the alignment film 606 at the boundary surface between the alignment film 606 and the underlying layer, and the refractive index $n_{S2}$ of the underlying layer at the boundary surface between the alignment film 606 and the underlying layer have the relationship of the equation (I).

Further, in the alignment film 606, the refractive index monotonically increases in the film thickness direction of the alignment film 606 from the boundary surface between the liquid crystal layer 11a and the alignment film 606 to the boundary surface between the alignment film 606 and the underlying layer. Further, in the alignment film 606, it is more desirable that the refractive index monotonically and continuously increases in the film thickness direction of the alignment film from the boundary surface between the liquid crystal layer 11a and the alignment film 606 to the boundary surface between the alignment film 606 and the underlying layer.

In order to realize the grated refractive index distribution, it is desirable that the refractive index distribution is smoothly modulated from z=0 to z=d, and this is realized by smoothly modulating the concentration of the chemical structure D.

Hereinafter, an alignment film including polyimide with the chemical structure D will be described in detail. The chemical structure D needs to increase the refractive index of the alignment film while maintaining all characteristics of the alignment film of the liquid crystal display element, that is, the characteristics of the existing alignment film such as an alignment regulation force of liquid crystal molecules, reliability at the time of driving for a long period of time, and transparency. That is, in the liquid crystal display device having a thin film layer with a high refractive index set to be 1.8 or more interposed therein, the alignment film needs to have a portion with a high refractive index set to be at least 1.7 or more and a portion with a low refractive index set to be from 1.5 to 1.6. As a means for realizing polymer having a high refractive index, for example, in the case of polyimide polymer, the means may be realized by using polyimide including plural sulfur atoms S in a molecular frame introduced in, for example, Technical document 3 below.

Technical document 3: Recent advancement of polyimide 2009, polyimide study committee, association for textile industrial technology, 90-92 (2008)

Specifically, a chemical structure may be exemplified which includes various sulfur atoms S, such as sulfide (—S—), sulfoxide (—SO—), sulfone (—SO$_2$—), or sulfonic acid (—SO$_3$H), sulfinic acid (—SO$_2$H), and esters thereof.

Alternatively, a chemical structure may be exemplified which includes selenium Se as a heavier atom, such as selenide (—Se—), selenoxide (—SeO—), selenon (—SeO$_2$—), or selenonic acid (—SeO$_3$H), selenic acid (—SeO$_2$H), and esters thereof.

Alternatively, a chemical structure may be exemplified which includes tellurium Te as a heavier atom, such as telluride (—TeO—), telluroxide (—TeO—), telluron (—TeO$_2$—), or telluronic acid (—TeO$_3$H), tellurinic acid (—TeO$_2$H), and esters thereof.

Further, a polymer having a high refractive index may be formed in such a manner that a terminally modified group adopts a heavy halogen atom, for example, chlorine-Cl, bromine-Br, iodine-I, and the like. The high refractive index may be obtained by using the chemical structure D capable of contributing to an increase in refractive index as much as possible. However, it is necessary to determine the optimal structure while seeking compatibility of other material properties such as the light absorbing property of the material or the liquid crystal molecule alignment capability.

In order to realize a polymer having a higher refractive index, a polymer may be used by dispersing or coordinate bonding transparent inorganic particles having a high refractive index, for example, nanoparticles equal to or smaller than the wavelength size of light such as ITO, zinc oxide ZnO, titanium oxide TiO$_2$, or zirconium oxide ZrO$_2$, but the polymer may be used only on the condition that other properties of the alignment film of the liquid crystal display element are not degraded.

On the other hand, in an organic compound having a low refractive index, polyimide used in the existing liquid crystal display element may be used, and various types of polyimides disclosed in, for example, Japanese Patent No. 4052308 may be used.

By mixing the organic component having a high refractive index and the organic compound having a low refractive index at an appropriate ratio, an organic compound having an intermediate refractive index may be realized. The refractive index of the organic compound of each single component may be evaluated by a method of forming each single thin film and evaluating the refractive index of the thin film by an existing method, for example, an Abbe refractometer, a prism coupling method, or the like.

As for the intermediate refractive index, a thin film is formed by uniformly mixing both organic compounds, and the refractive index is directly evaluated by the same method as described above. Also, the concentration of the element included in the original chemical structure D of the organic compound having a high refractive index, for example, S or the like is carefully observed, a correlation table between the concentration of the element and the refractive index of the thin film is created, and then the refractive index having an arbitrary concentration may be inserted (in many cases, the refractive index of the organic compound may be added). Alternatively, the distribution of the refractive index may be checked in such a manner that both end portions of the alignment film are cut, light is emitted to one end portion of the alignment film in the direction perpendicular to the film thickness direction, and the radiation of the light emitted from the other end portion is observed.

Even when the polymers having a high refractive index and a low refractive index are formed of organic compounds, the refractive index distribution needs to be realized in the film thickness direction of the alignment film having a film thickness of about 100 nm at most. For example, plural mixtures of organic compounds having an intermediate refractive index between the high refractive index and the low refractive index of the polymers are prepared, and are sequentially laminated (coated) from the side having the high refractive index, whereby a multi-layer having a gradually changing refractive index may be realized. However, when the total film thickness is 100 nm, the film thickness for each layer is equal to or less than 10 nm, and the film may not be uniformly formed. Further, the manufacturing cost markedly increases with plural times of lamination. If it is possible, it is desirable that the concentration of the chemical structure D naturally changes in the film thickness direction of the thin film formed by coating once.

In the case of a mixture including plural organic compounds, a phase separation structure may be naturally obtained due to a difference in molecular weight of each component or a difference in compatibility thereof, but this may not guarantee that a desired refractive index distribution is obtained in the film thickness direction.

Alternatively, a combination of organic compounds may be selected by using a difference in specific solubility in such a manner that an organic compound easily precipitated at an early timing is gradually separated toward the underlying layer and an organic compound hardly precipitated is gradually separated toward the liquid crystal layer.

Alternatively, a structure of naturally separating the components in the film thickness direction during the coating and drying process may be formed in such a manner that one organic compound adopts a polar group, for example, a hydroxyl group (—OH), a carboxylic acid group (—COOH), sulfonic acid group (—$SO_3H$), an amino group (-$NH_2$), a nitro group (-$NO_3$), a cyano group (—CN), or the like, the polarity is appropriately maintained, and an organic compound having insufficient polarity is combined. In this case, a large difference in polarity may be generated to a certain degree, or an optimal difference in polarity may be generated by, for example, a largeness of a molecular polarization of a polarity group alone or an introduction concentration thereof. In addition, a uniformly mixed solution needs to be formed before the coating, but this may be realized by, for example, solubility of a mixed solvent obtained by combining N-methylpyrrolidone (NMP) and γ-butyl lactone and optimization of the polarity ratio. For example, when a component having high polarity needs to be first precipitated toward the underlying layer, for example, in the case of the underlying layer formed of ITO, the precipitation may be realized by performing a surface cleaning treatment, a $UV/O_3$ treatment, a $O_2$ plasma treatment, or the like thereon to improve a hydrophilic property. On the contrary, when a component having low polarity needs to be first precipitated toward the underlying layer, the precipitation may be realized by performing a surface treatment, a $SF_4$ plasma treatment, a silane coupling agent treatment, or the like thereon to improve a hydrophobic property.

Further, in order to synthesize polyimide, polyamide acid before imidization, or polyamic acid ester having such characteristics, the synthesis may be performed using general aromatic polyimide, and for example, the synthesis may be performed by reacting pyromellitic dianhydride and p-phenylenediamine in an organic solvent. Among them, when polyamic acid ester is used as a precursor before imidization, there is an advantage that the reverse progress of imidization may be suppressed.

Alternatively, polyimide having a large molecular weight may be effectively obtained in such a manner that a precursor having a sufficiently large molecular weight is formed by synthesizing polyamic acid ester, and imidization is performed after ester dissociation reaction or vice versa. That is, it is appropriate that the alignment film 606 is formed of polyimide using polyamic acid ester as a precursor.

Further, as a method of coating the alignment films 606 and 705 formed of polyimide of the present invention onto various substrates, a general polyimide alignment film forming method may be used. For example, a solution (alignment film varnish) obtained by dissolving polyimide resin, polyamide acid as a precursor thereof, or polyamic acid ester in a predetermined solvent is coated by a spin coating method, the resultant object is heated at a predetermined condition to evaporate the solvent, and imidization progresses, thereby forming a thin film. Then, various alignment treatments, for example, a rubbing treatment using physical friction of smooth cloth, or a so-called photo-alignment treatment by emitting UV light to an alignment film material having a photoreactive group is performed on the surface of the polyimide thin film, thereby exhibiting liquid crystal alignment capability as the alignment film in the liquid crystal display element.

Further, the alignment film 606 may have in-plane optical anisotropy. As a method of obtaining optical anisotropy on the surface of the alignment film (inside the alignment film), the above-described photo-alignment treatment may be exemplified. Alternatively, for example, a method may be exemplified which stretches the alignment film 606 in one direction or applies a strong magnetic field thereto. Since optical anisotropy is obtained on the surface of the alignment film 606, the image quality of the liquid crystal display device may be improved. Also, since the direction of the optical anisotropic axis on the surface of the alignment film 606 is equal to the alignment regulation direction of the liquid crystal layer 11$a$, the transmission loss of the light originated from anisotropy may be suppressed, which is desirable in the improvement in transmissivity.

Further, the refractive index of the surface of the common electrode CT and/or the pixel electrode PX may be lower than the internal refractive index. For example, the surface of the common electrode CT becomes oxidized by performing an $O_2$ plasma treatment or the like on the surface. In this case, the refractive index of the surface of the common electrode CT becomes smaller than the internal refractive index thereof. As described above, the common electrode CT or the pixel electrode PX is formed of a sputtering film of ITO as a transparent electrode in many cases, and the refractive index thereof is as high as about 2.1. The refractive index of a portion contacting the common electrode CT or the pixel electrode PX is lower than that of the common electrode CT or the pixel electrode PX. When a difference in refractive index is large, a difference in refractive index may be decreased by performing the above-described treatment, which is desirable in the improvement in transmissivity.

Further, in the liquid crystal display device according to the embodiment of the present invention, an area having the liquid crystal alignment capability of the alignment film 606 may be within the range of 20 nm from the surface of the alignment film 606. Further, the area having the liquid crystal alignment capability of the alignment film 606 may be provided in the range of 20 nm from the surface of the alignment film. When a structure is formed in which the liquid crystal alignment capability is provided up to the deeper position, a problem may arise in that the mechanical strength of the entire alignment film is degraded. The degradation of the mechanical strength of the alignment film may occur when the liquid crystal display element is driven for a long period of time. That is, the initial alignment direction of the surface of the alignment film gradually vanishes, and the liquid crystal alignment capability is degraded, thereby degrading display characteristics.

In order to prevent such degradation, a display degradation may be effectively prevented by increasing a mechanical strength in such a manner that the alignment film obtains the liquid crystal alignment capability and chemical cross-linking is performed. That is, in the liquid crystal display device according to the embodiment of the present invention, the alignment film 606 may be formed by cross-linking compounds forming the alignment film 606 after obtaining the liquid crystal alignment capability.

Accordingly, the alignment film 606 obtaining the liquid crystal alignment capability has a cross-linking group, and may be appropriately subjected to a cross-linking treatment. For example, when the liquid crystal alignment capability is obtained by emitting the above-described UV light thereto, if X shown in the chemical formula (1) to show as follows has a cyclobutane group, the cyclobutane group is cleaved due to the emission of UV light, so that a maleimide group is formed. The compounds forming the alignment film are cross-linked to each other by the maleimide group. Further, since the compounds shown in the chemical formula (1) have a thermal reaction group such as an epoxy group, the compounds forming the alignment film are cross-linked to each other by the epoxy group.

In the liquid crystal display device according to the embodiment of the present invention, the coating ratio with respect to the display area of the alignment film 606 may be 50% or more. That is, since the reflection loss may be effectively suppressed when the coating ratio of the alignment film with respect to the display area of the liquid crystal display device is 50% or more, the transmissivity may be desirably improved.

Further, it is desirable that the coating ratio with respect to the display area of the alignment film is 60% or more, and it is more desirable that the coating ratio with respect to the display area of the alignment film is 75% or more.

Whether the alignment film mainly including an organic compound has a desired distribution structure of the chemical structure D may be checked by the following method. First, the uniformity of the thin film may be checked on the basis of whether the thin film is uniform or a domain structure is formed by observing the inside of the surface of the film using a microscope, a SEM (Scanning Electron Microscopy), an AFM (Atomic Force Microscopy), or the like.

Here, in order to see the uniformity of the distribution state of the chemical structure D within the plane, for example, the original sulfur atom S in the chemical structure D is mainly observed, and in-plane elemental mapping is performed by a SEM-EDX (Energy Dispersive X-ray spectrometry) or the like. As for the thin film structure in the film thickness direction, the wall of the thin film is opened or the cross-sectional surface of the film is exposed by a FIB (Focused Ion Beam Etching) or the like, and the presence of the domain structure is checked by observation using a SEM and a TEM (Transmission Electron Microscopy).

Further, as for the concentration distribution in the film thickness direction of the chemical structure D, for example, the original sulfur atom S in the chemical structure D is mainly observed, and the distribution is checked by an auger spectral analysis during an ion-beam sputtering. By the use of various analysis methods, whether the obtained thin film is uniform without phase dissociation or whether the chemical structure D has a desired concentration distribution may be checked. Then, the refractive index distribution in the film thickness direction may be estimated on the basis of the concentration distribution of the chemical structure D.

Further, the refractive index of each of the lowermost portion and the uppermost portion of the alignment film formed of the polymer mixture to have the concentration distribution of the chemical structure D in the film thickness direction may be checked by the following method. For example, when the underlying layer of the alignment film is a transparent electrode ITO, a solid film of ITO is formed on a glass substrate having the same refractive index as that of ITO by the same process, and the surface treatment as that of the actual liquid crystal display device is performed, thereby forming an alignment film of the present invention. Further, as a reference, a substrate without the alignment film is prepared.

First, as for a sample without the alignment film, the total reflection angle $\theta_{S2}$ at the boundary surface between air and the underlying layer is measured when light is incident from the glass substrate, and the refractive index of the uppermost portion of the underlying layer is obtained by $n_{S2}=1/\sin\theta_{S2}$ in terms of Snell's law. Next, a sample with the alignment film is prepared, and a carbon sputter coating is performed on the surface of the alignment film, thereby preventing the reflection of the light at the uppermost portion of the alignment film. Here, light is incident from the substrate side, and the reflected light is measured at the boundary surface between the underlying layer and the alignment film. At this time, a P-polarization component parallel to the light incident surface and an S-polarization component perpendicular to the light incident surface are separately measured, and Brewster's angle $\theta_{B1}$ at which the polarization component p becomes 0 is measured. Here, the refractive index at the lowermost portion of the alignment film may be obtained by $n_{F1}=n_{S2}\tan\theta_{B1}$. When both are equal to each other, no reflection occurs.

On the other hand, in order to obtain the refractive index $n_{F1}$ at the uppermost portion of the alignment film, a sample with the alignment film is prepared, the reflection at the boundary surface is prevented by performing a carbon sputter coating on a bottom surface of a glass substrate on the side of ITO, and the reference glass substrate having the refractive index $n_{RG}$ is bonded to the surface of the alignment film by matching oil. Light is incident from the reference glass substrate, and Brewster's angle $\theta_{RG}$ at which the polarization component p becomes 0 is measured by the same method. At this time, the refractive index at the uppermost portion of the alignment film may be obtained by $n_{F2}=n_{RG}\tan\theta_{RG}$. When both are equal to each other, no reflection occurs.

Hereinafter, the present invention will be described in more detail by using the examples, but the technical scope of the present invention is not limited to the examples below.

FIRST EXAMPLE

First, polyimide having a chemical structure shown in the following chemical formula (1) was variously synthesized as an alignment film.

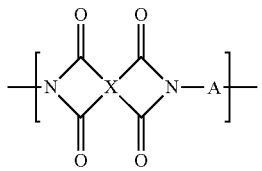
(1)

X in the chemical structure shown in the above-described chemical formula (1) includes two types of the following chemical formulae (X1) and (X2).

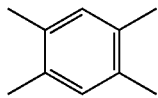
(X1)

In the synthesizing of polyimide, polyimide having the above-described chemical structure may be formed when pyromellitic acid is used as a raw material.

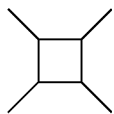
(X2)

In the synthesizing of polyimide, polyimide having the above-described chemical structure may be formed when cyclobutane-tetracarboxylic acid is used as a raw material.

Further, X in the chemical structure shown in the above-described chemical formula (1) may desirably adopt the following chemical formula (X3).

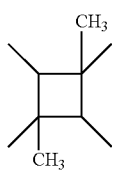
(X3)

In the synthesizing of polyimide, polyimide having the above-described chemical structure may be formed when 1,3 dimethyl-cyclobutane-tetracarboxylic acid is used as a raw material.

Further, A in the chemical structure shown in the above-described chemical formula (1) includes nine types of the following chemical formulae (Aa1) to (Ac2).

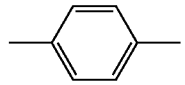
(Aa1)

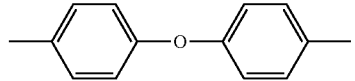
(Aa2)

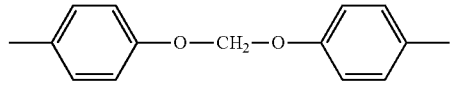
(Aa3)

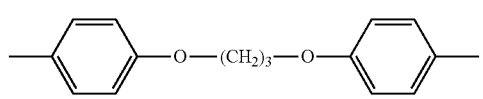
(Aa4)

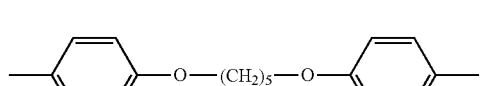
(Aa5)

(Ab1)

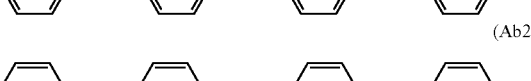
(Ab2)

(Ac1)

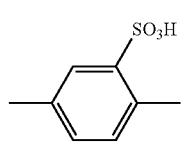
(Ac2)

The chemical frame A expressed by the chemical formulae (Aa1) to (Aa5) has a molecular frame having high liquid crystal alignment capability. Further, the chemical frame A expressed by the chemical formulae (Ab1) to (Ab2) includes a sulfur atom used to have a high refractive index. Further, as a molecular frame used to have polarity, the examples expressed by the chemical formulae (Ac1) to (Ac2) were selected.

Polyimide having the combination above was synthesized with polyamide acid as a precursor before imidization in accordance with the existing synthesis method. As for polyimide having a normal refractive index and no polarity, tetracarboxylic acid as a raw material and phenylenediamine were synthesized at the ratio of X:A=1:1 by the combination of X=X1, X2 and A=Aa1 to Ac5, whereby polyamic acid was synthesized (polyimide formed by the composition will be referred to as a symbol P—X-A, but X=1, 2, and A=a1 to a5). Further, as for polyimide having a high refractive index and polarity, tetracarboxylic acid as a raw material and phenylenediamine were synthesized at the ratio of X:(A+A')=1:1 by the combination of X=X1, X2, A=Ab1, Ab2, and A'=Ac1, Ac2, whereby polyamic acid was synthesized. When the ratio between A and A' was set to A+A'=100%, samples were manufactured in an order of A=0, 20, 40, 60, 80, 100% (polyimide formed by the composition will be referred to as a symbol P—X-AA'-n, but X=1, 2, A=b1 to b2, A'=c1 to c2, and n=0, 20, 40, 60, 80, 100). The molecular weight of the obtained polymer was determined by a GPC method, and a number average molecular weight expressed in terms of styrene was obtained. The obtained polyamide acid used the resultant dissolved in a mixed solvent of N-methylpyrrolidone (NMP), γ-butyl lactone (GBL), and butyl cellosolve (BC) as an alignment film varnish.

Next, a sample for evaluating the material property of the alignment film was manufactured by the following procedures. An ITO transparent electrode glass substrate was used as a substrate, and was sufficiently cleaned in advance and irradiated by UV/$O_3$. The alignment film varnish was spin-coated thereon by spin-coating, was immediately and temporarily dried at 80° C. for one minute, and imidized by baking at 230° C. for one hour. Here, the rotation speed of the spin-coating and the concentration of the varnish were selected so that the film thickness became about 200 nm after the imidization by baking. Further, the refractive index of the obtained polyimide thin film was evaluated by using an Abbe refractometer, and the average value measured in the range of a wavelength from 380 to 780 nm using spectroanalysis of a white light source was set as the refractive index of the thin film.

Tables 1A to 1E show the molecular weight and the refractive index of the obtained polyimide thin film. In polyimide that has a normal refractive index, but does not have a polarity group, the refractive index is from about 1.5 to about 1.6. However, in polyimide that has a high refractive index and a polarity group, the refractive index is 1.7 or more.

TABLE 1A

| POLYMER | MOLECULAR WEIGHT | REFRACTIVE INDEX |
|---|---|---|
| P-1-a1 | 15,600 | 1.610 |
| P-1-a2 | 16,100 | 1.605 |
| P-1-a3 | 16,200 | 1.600 |
| P-1-a4 | 15,200 | 1.594 |
| P-1-a5 | 15,900 | 1.588 |
| P-2-a1 | 15,100 | 1.596 |
| P-2-a2 | 15,300 | 1.592 |
| P-2-a3 | 16,400 | 1.587 |
| P-2-a4 | 15,700 | 1.579 |
| P-2-a5 | 16,400 | 1.569 |

TABLE 1B

| POLYMER | MOLECULAR WEIGHT | REFRACTIVE INDEX |
|---|---|---|
| P-1-b1c1-0 | 15,500 | 1.604 |
| P-1-b1c1-20 | 15,000 | 1.634 |
| P-1-b1c1-40 | 16,200 | 1.665 |
| P-1-b1c1-60 | 15,700 | 1.695 |
| P-1-b1c1-80 | 16,200 | 1.725 |
| P-1-b1c1-100 | 15,200 | 1.753 |
| P-2-b1c1-0 | 15,800 | 1.583 |
| P-2-b1c1-20 | 15,300 | 1.616 |
| P-2-b1c1-40 | 15,000 | 1.649 |
| P-2-b1c1-60 | 15,700 | 1.684 |
| P-2-b1c1-80 | 16,300 | 1.716 |
| P-2-b1c1-100 | 15,600 | 1.748 |

TABLE 1C

| POLYMER | MOLECULAR WEIGHT | REFRACTIVE INDEX |
|---|---|---|
| P-1-b1c2-0 | 15,100 | 1.734 |
| P-1-b1c2-20 | 15,700 | 1.738 |
| P-1-b1c2-40 | 15,400 | 1.742 |

TABLE 1C-continued

| POLYMER | MOLECULAR WEIGHT | REFRACTIVE INDEX |
|---|---|---|
| P-1-b1c2-60 | 15,900 | 1.745 |
| P-1-b1c2-80 | 15,000 | 1.749 |
| P-1-b1c2-100 | 15,200 | 1.753 |
| P-2-b1c2-0 | 15,900 | 1.583 |
| P-2-b1c2-20 | 15,000 | 1.616 |
| P-2-b1c2-40 | 16,200 | 1.650 |
| P-2-b1c2-60 | 15,800 | 1.683 |
| P-2-b1c2-80 | 15,400 | 1.717 |
| P-2-b1c2-100 | 15,600 | 1.748 |

TABLE 1D

| POLYMER | MOLECULAR WEIGHT | REFRACTIVE INDEX |
|---|---|---|
| P-1-b2c1-0 | 15,500 | 1.604 |
| P-1-b2c1-20 | 16,200 | 1.634 |
| P-1-b2c1-40 | 16,200 | 1.664 |
| P-1-b2c1-60 | 15,800 | 1.694 |
| P-1-b2c1-80 | 16,200 | 1.723 |
| P-1-b2c1-100 | 16,300 | 1.753 |
| P-2-b2c1-0 | 15,800 | 1.583 |
| P-2-b2c1-20 | 15,700 | 1.616 |
| P-2-b2c1-40 | 15,000 | 1.649 |
| P-2-b2c1-60 | 16,000 | 1.682 |
| P-2-b2c1-80 | 15,000 | 1.715 |
| P-2-b2c1-100 | 15,700 | 1.746 |

TABLE 1E

| POLYMER | MOLECULAR WEIGHT | REFRACTIVE INDEX |
|---|---|---|
| P-1-b2c2-0 | 15,100 | 1.734 |
| P-1-b2c2-20 | 15,100 | 1.738 |
| P-1-b2c2-40 | 16,100 | 1.742 |
| P-1-b2c2-60 | 15,100 | 1.745 |
| P-1-b2c2-80 | 16,200 | 1.749 |
| P-1-b2c2-100 | 16,300 | 1.753 |
| P-2-b2c2-0 | 15,900 | 1.583 |
| P-2-b2c2-20 | 15,500 | 1.616 |
| P-2-b2c2-40 | 15,300 | 1.649 |
| P-2-b2c2-60 | 16,000 | 1.681 |
| P-2-b2c2-80 | 15,100 | 1.714 |
| P-2-b2c2-100 | 15,700 | 1.746 |

Next, such polyimides were combined to form blend polymer, and the resultant was subjected to spin coating, drying, and imidization by baking in the same procedure. Next, the result will be described. The polyimide having a low refractive index component and the polyimide having a high refractive index component were mixed with each other at the weight ratio of 1:1 in a varnish state, and the mixture was used as a varnish for blend polymer. In the same condition, the thickness of the film was thickened, the surface state thereof was first observed by SEM, AFM, or the like, and a phase separation was performed. Even in this state, the result in which a sea-island structure was observed was determined as a inhomogeneous state (symbol: I), and the result in which a domain was not particularly observed was determined as a homogeneous state (symbol: H). Next, as for the thin film in a homogeneous state, an auger spectral analysis was performed in the depth direction, and as in the profile of the concentration of sulfur atom S shown in FIG. 5B, the case where the concentration smoothly decreases from the ITO to the surface of the film (the case where the concentration continuously and monotonically decreases) was determined as a gradient state (symbol: G). Tables 3 to 5 show the evaluation result.

In the evaluation result, the material of each table has the following combinations (1) to (5).

(1) Table 1: A to D: low refractive index component=P-1-a1 to a5 and P-2-a1 to a5 as common material
(2) Table 2: high refractive index component=P-1-b1c1-0 to 100, P-2-b1c1-0 to 100
(3) Table 3: high refractive index component=P-1-b1c2-0 to 100, P-2-b1c2-0 to 100
(4) Table 4: high refractive index component=P-1-b2c1-0 to 100, P-2-b2c1-0 to 100
(5) Table 5: high refractive index component=P-1-b2c2-0 to 100, P-2-b2c2-0 to 100

TABLE 2A

| POLYMER | P-1-a1 | P-1-a2 | P-1-a3 | P-1-a4 | P-1-a5 |
|---|---|---|---|---|---|
| P-1-b1c1-0 | I | I | H | H | H |
| P-1-b1c1-20 | I | I | H | H | H |
| P-1-b1c1-40 | I | I | H | H | H |
| P-1-b1c1-60 | I | H | H | H | H |
| P-1-b1c1-80 | H | H | H | H | H |
| P-1-b1c1-100 | H | H | H | H | H |
| P-2-b1c1-0 | I | I | I | H | H |
| P-2-b1c1-20 | I | I | H | H | H |
| P-2-b1c1-40 | I | I | H | H | H |
| P-2-b1c1-60 | I | I | H | H | H |
| P-2-b1c1-80 | I | H | H | H | H |
| P-2-b1c1-100 | H | H | H | H | H |

TABLE 2B

| POLYMER | P-2-a1 | P-2-a2 | P-2-a3 | P-2-a4 | P-2-a5 |
|---|---|---|---|---|---|
| P-1-b1c1-0 | I | I | I | H | H |
| P-1-b1c1-20 | I | I | H | H | H |
| P-1-b1c1-40 | I | I | H | H | H |
| P-1-b1c1-60 | I | I | H | H | H |
| P-1-b1c1-80 | H | H | H | HG | HG |
| P-1-b1c1-100 | H | H | H | H | H |
| P-2-b1c1-0 | I | I | H | H | H |
| P-2-b1c1-20 | I | I | H | H | H |
| P-2-b1c1-40 | I | I | H | H | H |
| P-2-b1c1-60 | I | H | H | H | H |
| P-2-b1c1-80 | H | H | H | H | HG |
| P-2-b1c1-100 | H | H | H | H | H |

TABLE 3A

| POLYMER | P-1-a1 | P-1-a2 | P-1-a3 | P-1-a4 | P-1-a5 |
|---|---|---|---|---|---|
| P-1-b1c2-0 | I | I | I | I | HG |
| P-1-b1c2-20 | I | I | I | HG | HG |
| P-1-b1c2-40 | I | I | HG | HG | HG |
| P-1-b1c2-60 | I | I | HG | HG | HG |
| P-1-b1c2-80 | I | HG | HG | HG | HG |
| P-1-b1c2-100 | H | H | H | H | H |
| P-2-b1c2-0 | I | I | I | I | I |
| P-2-b1c2-20 | I | I | I | H | H |
| P-2-b1c2-40 | I | I | H | H | H |
| P-2-b1c2-60 | I | I | H | H | H |
| P-2-b1c2-80 | I | I | H | H | H |
| P-2-b1c2-100 | H | H | H | H | H |

TABLE 3B

| POLYMER | P-2-a1 | P-2-a2 | P-2-a3 | P-2-a4 | P-2-a5 |
|---|---|---|---|---|---|
| P-1-b1c2-0 | I | I | I | I | I |
| P-1-b1c2-20 | I | I | I | I | HG |
| P-1-b1c2-40 | I | I | I | HG | HG |
| P-1-b1c2-60 | I | I | HG | HG | HG |
| P-1-b1c2-80 | I | HG | HG | HG | HG |
| P-1-b1c2-100 | H | H | H | H | H |
| P-2-b1c2-0 | I | I | I | I | H |
| P-2-b1c2-20 | I | I | I | H | H |
| P-2-b1c2-40 | I | I | H | H | H |
| P-2-b1c2-60 | I | I | H | H | H |
| P-2-b1c2-80 | I | H | H | H | HG |
| P-2-b1c2-100 | H | H | H | H | H |

TABLE 4A

| POLYMER | P-1-a1 | P-1-a2 | P-1-a3 | P-1-a4 | P-1-a5 |
|---|---|---|---|---|---|
| P-1-b2c1-0 | I | I | H | H | H |
| P-1-b2c1-20 | I | I | H | H | H |
| P-1-b2c1-40 | I | I | H | H | H |
| P-1-b2c1-60 | I | H | H | H | H |
| P-1-b2c1-80 | H | H | H | H | H |
| P-1-b2c1-100 | H | H | H | H | H |
| P-2-b2c1-0 | I | I | I | H | H |
| P-2-b2c1-20 | I | I | I | H | H |
| P-2-b2c1-40 | I | I | H | H | H |
| P-2-b2c1-60 | I | I | H | H | H |
| P-2-b2c1-80 | I | H | H | H | H |
| P-2-b2c1-100 | H | H | H | H | H |

TABLE 4B

| POLYMER | P-2-a1 | P-2-a2 | P-2-a3 | P-2-a4 | P-2-a5 |
|---|---|---|---|---|---|
| P-1-b2c1-0 | I | I | I | H | H |
| P-1-b2c1-20 | I | I | I | H | H |
| P-1-b2c1-40 | I | I | H | H | H |
| P-1-b2c1-60 | I | I | H | H | H |
| P-1-b2c1-80 | I | H | H | HG | HG |
| P-1-b2c1-100 | H | H | H | H | H |
| P-2-b2c1-0 | I | I | H | H | H |
| P-2-b2c1-20 | I | I | I | H | H |
| P-2-b2c1-40 | I | I | H | H | H |
| P-2-b2c1-60 | I | I | H | H | H |
| P-2-b2c1-80 | I | H | H | H | HG |
| P-2-b2c1-100 | H | H | H | H | H |

TABLE 5A

| POLYMER | P-1-a1 | P-1-a2 | P-1-a3 | P-1-a4 | P-1-a5 |
|---|---|---|---|---|---|
| P-1-b2c2-0 | I | I | I | I | HG |
| P-1-b2c2-20 | I | I | I | I | HG |
| P-1-b2c2-40 | I | I | HG | HG | HG |
| P-1-b2c2-60 | I | HG | HG | HG | HG |
| P-1-b2c2-80 | H | HG | HG | HG | HG |
| P-1-b2c2-100 | H | H | H | H | H |
| P-2-b2c2-0 | I | I | I | I | I |
| P-2-b2c2-20 | I | I | I | I | H |
| P-2-b2c2-40 | I | I | I | H | H |
| P-2-b2c2-60 | I | I | I | H | H |
| P-2-b2c2-80 | I | I | H | H | H |
| P-2-b2c2-100 | H | H | H | H | H |

TABLE 5B

| POLYMER | P-2-a1 | P-2-a2 | P-2-a3 | P-2-a4 | P-2-a5 |
|---|---|---|---|---|---|
| P-1-b2c2-0 | I | I | I | I | I |
| P-1-b2c2-20 | I | I | HG | HG | HG |
| P-1-b2c2-40 | I | I | HG | HG | HG |
| P-1-b2c2-60 | I | I | HG | HG | HG |
| P-1-b2c2-80 | HG | HG | HG | HG | HG |

TABLE 5B-continued

| POLYMER | P-2-a1 | P-2-a2 | P-2-a3 | P-2-a4 | P-2-a5 |
|---|---|---|---|---|---|
| P-1-b2c2-100 | H | H | H | H | H |
| P-2-b2c2-0 | I | I | I | I | H |
| P-2-b2c2-20 | I | I | I | I | H |
| P-2-b2c2-40 | I | I | I | H | H |
| P-2-b2c2-60 | I | I | H | H | H |
| P-2-b2c2-80 | I | H | H | H | HG |
| P-2-b2c2-100 | H | H | H | H | H |

When various combinations of the materials are searched in this manner, the condition (symbol: HG) capable of realizing the grated concentration distribution may be found. However, any condition may not be found in each Table (for example, Table 2A) or the condition may be found very frequently (for example, Table 3A). That is, the alignment film having a desired grated concentration distribution is difficult to be realized by a simple attempt in which the high refractive index component and the low refractive index component are combined, or a non-polarity component and a high-polarity component are combined.

Next, the IPS type liquid crystal display element is manufactured by using the polyimide alignment film at the condition capable of realizing the grated concentration distribution, and the evaluation result of the transmissivity thereof will be described. As for the polymer of X—X1, a rubbing alignment treatment was performed by using a rubbing cloth made of rayon in the condition that the rotation speed was 1500 rpm, the transfer speed was 32.5 mm/min, the cutting depth was 0.4 mm, and the temperature was room temperature under the presence of the atmosphere. Further, as for the polymer of X=X2, photo-alignment treatment was performed in the condition that polarized UV light was emitted to the surface of the substrate in the perpendicular direction, light having a wavelength from 230 to 300 nm was selectively emitted from a low-pressure mercury light source, the temperature of the substrate was 200° C. during the emission, and the emission energy was 2 J.

The liquid crystal panel is manufactured by the same process in the general manufacturing process except that the alignment film is formed of the alignment film material of the present invention. For example, in the case of the representative manufacturing method of the IPS type liquid crystal display device, the active matrix substrate 6 and the counter substrate 7 subjected to the alignment treatment in advance are bonded to each other, and a liquid crystal material is enclosed therebetween to assemble a cell. However, at this time, the initial alignment direction of the alignment film 606 of the active matrix substrate 6 and the initial alignment direction of the alignment film 705 of the counter substrate 7 are set to be substantially parallel to each other.

Further, as the liquid material to be enclosed, for example, a nematic liquid crystal composition A is used in which dielectric anisotropy $\Delta\epsilon$ is positive, the value thereof is 10.2 (1 kHz, 20° C.), the refractive index anisotropy $\Delta n$ is 0.075 (wavelength of 590 nm, 20° C.), the torsion elastic constant K2 is 7.0 pN, the nematic-isotropic phase transition temperature T (N–I) is about 76° C., and the specific resistance is $1\times10^{+13}$ $\Omega$cm. In this case, the active matrix substrate 6 and the counter substrate 7 may be bonded to each other so that the thickness (cell gap) of the liquid crystal layer 11a is substantially equal to the height of the columnar spacer 10 such as to be, for example, 4.2 µm. The retardation ($\Delta n \cdot d$) of the liquid crystal display panel 1 manufactured in this condition is about 0.31 µm. It is desirable that the retardation $\Delta n \cdot d$ is 0.2 µm≤$\Delta n \cdot d$≤0.5 µm, and when the retardation exceeds this range, a problem arises in that a white display occurs.

When the active matrix substrate 6 and the counter substrate 7 are bonded to each other and a liquid crystal material is enclosed therebetween, for example, the unnecessary portions (margin portions) of the outer peripheries of the glass substrates 601 and 701 are cut to be eliminated, and polarizers 9a and 9b are bonded thereto. When the polarizers 9a and 9b are bonded to each other, the polarization transmission axis of one polarizer is set to be substantially parallel to the initial alignment directions of the alignment film 606 of the active matrix substrate 6 and the alignment film 705 of the counter substrate 7, and the polarization transmission axis of the other polarizer is set to be perpendicular thereto. Subsequently, when the first driving circuit 2, the second driving circuit 3, the control circuit 4, the backlight 5, and the like are connected to each other to be formed as a module, the liquid crystal display device having the liquid crystal display panel 1 of the first example is obtained.

Incidentally, in the liquid crystal display panel 1 of the first example, when a difference in potential between the pixel electrode PX and the common electrode CT is small, a dark display (low-luminance display) is performed. When a difference in potential between the pixel electrode PX and the common electrode CT is large, a bright display (high-luminance display) is performed. In this manner, the liquid crystal panel has a normally-closed characteristic. Even in the case of any type of the liquid crystal display device, each type is manufactured by the general process so that a dark display and a bright display may be performed.

As for the transmissivity of the liquid crystal display element, a white cold cathode tube backlight was used as a light source, the light transmitted through the liquid crystal display element was input to the actinometer without dividing the light, and the transmissivity of the light was expressed as a percentage. Further, for the comparison, the transmissivity was measured when each of the single low refractive index component and the single high refractive index component formed the alignment film. Table shows the evaluation result. In any combination, the transmissivity of the grated concentration film is improved compared with the case of a single low refractive index and a single high refractive index.

TABLE 6

| LOW REFRACTIVE INDEX COMPONENT | | HIGH REFRACTIVE INDEX COMPONENT | | TRANSMISSIVITY (%) | | |
|---|---|---|---|---|---|---|
| SYMBOL | REFRACTIVE INDEX | SYMBOL | REFRACTIVE INDEX | SINGLE LOW REFRACTIVE INDEX | SINGLE HIGH REFRACTIVE INDEX | GRATED CONCENTRATION FILM |
| P-2-a4 | 1.579 | P-1-b1c1-80 | 1.725 | 83.9 | 81.4 | 94.2 |

TABLE 6-continued

| LOW REFRACTIVE INDEX COMPONENT | | HIGH REFRACTIVE INDEX COMPONENT | | TRANSMISSIVITY (%) | | |
| --- | --- | --- | --- | --- | --- | --- |
| SYMBOL | REFRACTIVE INDEX | SYMBOL | REFRACTIVE INDEX | SINGLE LOW REFRACTIVE INDEX | SINGLE HIGH REFRACTIVE INDEX | GRATED CONCENTRATION FILM |
| P-1-a3 | 1.600 | P-1-b1c2-60 | 1.745 | 89.0 | 89.1 | 95.5 |
| P-2-a5 | 1.569 | P-2-b2c1-80 | 1.715 | 78.6 | 80.8 | 86.8 |
| P-1-a2 | 1.605 | P-1-b2c2-60 | 1.745 | 86.8 | 87.5 | 98.0 |

As described above, in the polyimide alignment film having a grated refractive index, there is an effect of improving the transmissivity of the liquid crystal display device.

SECOND EXAMPLE

Next, the FFS type liquid crystal display element shown in FIG. 3 is manufactured by using the alignment film material shown in the first example, and the evaluation result of the transmissivity will be described. The element structure of the FFS type is similar to that of the IPS type, only one of the upper and lower underlying substrates is provided with the pixel electrode PX and the common electrode CT, and the liquid crystal rotates within the plane in accordance with the presence of the electric field. Accordingly, the initial alignment state without the application of the electric field is also equal to that of the IPS type, the direction may be equal to the alignment direction to be formed in the alignment film 606 (and 705), and the liquid crystal to be used may be the liquid crystal having positive dielectric anisotropy $\Delta\in$.

Table 7 shows the evaluation result. In any combination, the transmissivity of the grated concentration film is improved compared with the case of a single low refractive index and a single high refractive index.

TABLE 7

| LOW REFRACTIVE INDEX COMPONENT | | HIGH REFRACTIVE INDEX COMPONENT | | TRANSMISSIVITY (%) | | |
| --- | --- | --- | --- | --- | --- | --- |
| SYMBOL | REFRACTIVE INDEX | SYMBOL | REFRACTIVE INDEX | SINGLE LOW REFRACTIVE INDEX | SINGLE HIGH REFRACTIVE INDEX | GRATED CONCENTRATION FILM |
| P-2-a4 | 1.579 | P-1-b1c1-80 | 1.725 | 83.4 | 84.5 | 89.2 |
| P-1-a3 | 1.600 | P-1-b1c2-60 | 1.745 | 85.6 | 85.9 | 95.4 |
| P-2-a5 | 1.569 | P-2-b2c1-80 | 1.715 | 78.6 | 79.2 | 84.9 |
| P-1-a2 | 1.605 | P-1-b2c2-60 | 1.745 | 87.1 | 89.6 | 96.8 |

As described above, in the polyimide alignment film having a grated refractive index, there was an effect of improving the light transmissivity of the liquid crystal display device.

THIRD EXAMPLE

Next, the VA type liquid crystal display element shown in FIG. 4 will be manufactured by using the alignment film material shown in the first example, and the evaluation result of the light transmissivity will be described. The VA type is different from the IPS type or the FFS type in that the upper and lower underlying substrates are provided with the pixel electrode PX and the common electrode CT, a liquid crystal material for a VA type having negative dielectric anisotropy $\Delta\in$ is used, and the alignment treatment needs to be performed so that the liquid crystal molecule is substantially perpendicular to the surface of the substrate at the initial alignment state where there is no application of an electric field. For this reason, it is difficult to use a general rubbing treatment. Here, as shown in Technical document 4 below, photo-alignment treatment was performed by emitting polarized UV light in a gradient direction.

Technical document 4: P. Gass, H. Stevenson, R. Bay, H. Walton, N. Smith, S. Terashita, and M. illin: Pattern Optical Alignment For Vertical Alignment LCD: Sharp Technical Journal Vol. 85 (2003) 24-29

Table 8 shows the evaluation result. In any combination, the transmissivity of the grated concentration film is improved compared with the case of a single low refractive index and a single high refractive index.

TABLE 8

| LOW REFRACTIVE INDEX COMPONENT | | HIGH REFRACTIVE INDEX COMPONENT | | TRANSMISSIVITY (%) | | |
| --- | --- | --- | --- | --- | --- | --- |
| | | | | SINGLE LOW | SINGLE HIGH | GRATED |
| SYMBOL | REFRACTIVE INDEX | SYMBOL | REFRACTIVE INDEX | REFRACTIVE INDEX | REFRACTIVE INDEX | CONCENTRATION FILM |
| P-2-a4 | 1.579 | P-1-b1c1-80 | 1.725 | 83.0 | 84.0 | 89.1 |
| P-1-a3 | 1.600 | P-1-b1c2-60 | 1.745 | 87.8 | 86.2 | 96.3 |
| P-2-a5 | 1.569 | P-2-b2c1-80 | 1.715 | 77.1 | 80.2 | 85.6 |
| P-1-a2 | 1.605 | P-1-b2c2-60 | 1.745 | 89.0 | 89.9 | 96.9 |

As described above, in the polyimide alignment film having a grated refractive index, there is an effect of improving the light transmissivity of the liquid crystal display device.

Further, in the first to third examples, plural types of polyimides were used as the organic compounds forming the alignment film, but for example, the alignment film may be formed by mixing other polymers or only by an organic compound except for polyimide.

While there have been described what are at present considered to be certain embodiments of the present invention, it will be understood that various modifications may be made thereto, and it is intended that the appended claim cover all such modifications as fall within the true spirit and scope of the present invention.

What is claimed is:

1. A liquid crystal display device comprising:
   first and second substrates, at least one of which is transparent;
   a liquid crystal layer which is disposed between the first and second substrates;
   an electrode group which is formed on at least one of the first and second substrates and applies an electric field to the liquid crystal layer;
   a plurality of active elements which is connected to the electrode group;
   an alignment film which is disposed on at least one of the first and second substrates and has one surface contacting the liquid crystal layer; and
   an underlying layer which is disposed on at least one of the first and second substrates and contacts the other surface of the alignment film,
   wherein the alignment film includes a plurality of types of organic compounds having refractive indexes and polarities respectively different from one another, each of the plurality of types of organic compounds being separated in the film thickness direction according to the polarities;
   wherein the refractive index of the alignment film monotonically increases from a boundary surface between the alignment film and the liquid crystal layer to a boundary surface between the alignment film and the underlying layer, and
   wherein the minimum refractive index $nLC$ of the liquid crystal layer, the refractive index $nF2$ of the alignment film at the boundary surface between the liquid crystal layer and the alignment film, the refractive index $nF1$ of the alignment film at the boundary surface between the alignment film and the underlying layer, and the refractive index $nS2$ of the underlying layer have a relationship of an equation (I) in which $nLC \leq nF2 < nF1 \leq nS2$.

2. The liquid crystal display device according to claim 1,
   wherein the underlying layer is a transparent layer through which visible light is transmitted,
   wherein the electrode group includes a common electrode and a pixel electrode, and
   wherein a surface opposite to a surface contacting the alignment film in the underlying layer contacts any one of the common electrode and the pixel electrode.

3. The liquid crystal display device according to claim 2, wherein the refractive index $nS2$ of the underlying layer and the refractive index $nPE$ of the one electrode at the boundary surface between the underlying layer and the one electrode have a relationship of an equation (II) in which $|nS2-nPE| \leq 0.1$.

4. The liquid crystal display device according to claim 2,
   wherein a part of the surface opposite to the surface contacting the alignment film in the underlying layer contacts the one electrode and the other part thereof contacts an interlayer isolation film, and
   wherein the refractive index $nS2$ of the underlying layer and the refractive index $nL1$ of the interlayer isolation film have a relationship of an equation (III) in which $|nS2-nLI| \leq 0.1$.

5. The liquid crystal display device according to claim 2, wherein the refractive index of the surface of the one electrode is lower than the internal refractive index.

6. The liquid crystal display device according to claim 1,
   wherein the electrode group includes a common electrode and a pixel electrode,
   wherein the underlying layer includes an interlayer isolation film contacting a surface opposite to a surface contacting the liquid crystal layer in the alignment film and any one of the common electrode and the pixel electrode provided in a part of a surface on the side of the alignment film in the interlayer isolation film and protruding toward the alignment film,
   wherein the alignment film is formed on the underlying layer, and
   wherein the film thickness of the alignment film is larger than that of the one electrode.

7. The liquid crystal display device according to claim 1, wherein the alignment film has an in-plane optical anisotropy.

8. The liquid crystal display device according to claim 7, wherein the direction of the in-plane optical anisotropic axis of the alignment film is equal to the alignment regulation direction of the liquid crystal layer.

9. The liquid crystal display device according to claim 1, wherein in the plurality of types of organic compounds forming the alignment film, the refractive index in the visible range of the organic compound having the highest refractive index is 1.7 or more.

10. The liquid crystal display device according to claim 1, wherein the alignment film is formed of polyimide using polyamic acid ester as a precursor.

11. The liquid crystal display device according to claim 1, wherein the alignment film obtains liquid crystal alignment capability by photo-alignment treatment.

12. The liquid crystal display device according to claim 1, wherein the alignment film obtains liquid crystal alignment capability by a rubbing treatment.

13. The liquid crystal display device according to claim 1, wherein an area obtaining liquid crystal alignment capability of the alignment film is within a range of 20 nm from a surface of the alignment film.

14. The liquid crystal display device according to claim 1, wherein compounds forming the alignment film are cross-linked to each other after the alignment film obtains liquid crystal alignment capability.

15. The liquid crystal display device according to claim 1, wherein the coating ratio with respect to a display area of the alignment film is 50% or more.

* * * * *